US010802594B2

(12) United States Patent
Lee

(10) Patent No.: US 10,802,594 B2
(45) Date of Patent: Oct. 13, 2020

(54) REMOTE CONTROL SYSTEM AND METHOD OF GENERATING A CONTROL COMMAND ACCORDING TO AT LEAST ONE STATIC GESTURE

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

(*) Notice: Subject to any disclaimer, the term of this patent is extended or adjusted under 35 U.S.C. 154(b) by 0 days.

(21) Appl. No.: 15/096,286

(22) Filed: Apr. 12, 2016

(65) Prior Publication Data
US 2016/0306432 A1 Oct. 20, 2016

(30) Foreign Application Priority Data
Apr. 17, 2015 (TW) .............................. 104112441 A

(51) Int. Cl.
G06F 3/01 (2006.01)
G06K 9/00 (2006.01)
G06F 3/03 (2006.01)

(52) U.S. Cl.
CPC ............ G06F 3/017 (2013.01); G06F 3/0304 (2013.01); G06F 3/0325 (2013.01); G06K 9/00355 (2013.01)

(58) Field of Classification Search
CPC ...... G06F 3/017; G06F 3/0304; G06F 3/0325; G06K 9/00355
See application file for complete search history.

(56) References Cited

U.S. PATENT DOCUMENTS

2010/0007717 A1* 1/2010 Spektor .............. G06K 9/00355
348/43
2012/0119987 A1* 5/2012 Im ........................ G06F 3/0304
345/156
2012/0229377 A1* 9/2012 Kim ........................ G06F 3/017
345/157

(Continued)

FOREIGN PATENT DOCUMENTS

CN 102057365 A 5/2011
TW 201237773 A1 9/2012

(Continued)

Primary Examiner — Brent D Castiaux
(74) Attorney, Agent, or Firm — Winston Hsu

(57) ABSTRACT

A remote control system includes an object detection unit, an object determination unit, and a static gesture processing unit. The object detection unit detects an object corresponding to an operator according to a depth image including the operator and a face detection result corresponding to the operator. The object determination unit utilizes a combination of a gesture database, a color image of the object, and a two-dimensional image corresponding to the depth map to determine a gesture formed by the object when the operator moves the object to a predetermined position. The operator moves the object to the predetermined position and pulls the object after the operator moves the object to the predetermined position within a first predetermined period. The static gesture processing unit generates a first control command to control an electronic device according to at least one static gesture determined by the object determination unit.

18 Claims, 22 Drawing Sheets

(56) References Cited

U.S. PATENT DOCUMENTS

| | | | | |
|---|---|---|---|---|
| 2012/0236180 A1* | 9/2012 | Lin | ............... | G06F 3/011 |
| | | | | 348/239 |
| 2013/0229491 A1* | 9/2013 | Kim | ............. | G06F 1/3265 |
| | | | | 348/46 |
| 2013/0229499 A1* | 9/2013 | Zhao | ............ | G06F 3/0485 |
| | | | | 348/51 |
| 2014/0085223 A1* | 3/2014 | Liang | ............ | G06F 3/017 |
| | | | | 345/173 |
| 2014/0089849 A1* | 3/2014 | Choi | ............ | G06F 3/017 |
| | | | | 715/810 |
| 2014/0191998 A1* | 7/2014 | Chuang | ......... | G06F 3/017 |
| | | | | 345/173 |
| 2015/0205521 A1* | 7/2015 | Ding | ............ | G06F 1/1684 |
| | | | | 345/175 |

FOREIGN PATENT DOCUMENTS

| TW | 201327358 A1 | 7/2013 |
|---|---|---|
| TW | 201426413 A | 7/2014 |
| TW | 201445360 A | 12/2014 |

\* cited by examiner

REMOTE CONTROL SYSTEM AND METHOD OF GENERATING A CONTROL COMMAND ACCORDING TO AT LEAST ONE STATIC GESTURE

BACKGROUND OF THE INVENTION

1. Field of the Invention

The present invention relates to a remote control system and a method of generating a control command according to at least one static gesture, and particularly to a remote control system and a method of generating a control command according to at least one static gesture that can quickly generate a control command and meet body mechanics without complicated gestures, complicated operations, a powerful processor, and a large-capacity memory.

2. Description of the Prior Art

Generally speaking, although touch operation dominates smart portable devices, the touch operation cannot be widely applied to a smart television (TV) (because a distance between an operator and the smart TV is usually greater than length of an arm of the operator). Therefore, in a remote control application of the smart TV, gesture operation substitutes for the touch operation to dominate the smart TV. In the prior art, a remote control system applied to the smart TV continuously captures images including the operator through image sensors thereof, and then the remote control system can execute complicated operations on the images including the operator to generate a skeleton of the operator. After the remote control system generates the skeleton of the operator, the remote control system can generate a complicated cursor control command or a complicated posture control command according to the skeleton of the operator.

However, because the prior art executes the complicated operations on the images including the operator to generate the skeleton of the operator, the prior art needs a powerful processor and a large-capacity memory, resulting in the prior art is not a better choice for the operator.

SUMMARY OF THE INVENTION

An embodiment of the present invention provides a remote control system. The remote control system includes an object detection unit, an object determination unit, and a static gesture processing unit. The object detection unit is used for detecting an object corresponding to an operator according to a depth image including the operator and a face detection result corresponding to the operator. The object determination unit is used for utilizing at least one of a gesture database, a color image of the object, and a two-dimensional image corresponding to the depth image to determine a gesture formed by the object when the operator moves the object to a predetermined position, wherein the operator moves the object to the predetermined position within a first predetermined period and pulls the object after the operator moves the object to the predetermined position. The static gesture processing unit is used for generating a first control command to control an electronic device according to at least one gesture determined by the object determination unit.

Another embodiment of the present invention provides a method of generating a control command according to at least one static gesture, wherein a remote control system applied to the method includes an object detection unit, an object determination unit, and a static gesture processing unit. The method includes the object detection unit detecting an object corresponding to an operator according to a depth image including the operator and a face detection result corresponding to the operator; the object determination unit utilizing at least one of a gesture database, a color image of the object, and a two-dimensional image corresponding to the depth image to determine a gesture formed by the object when the operator moves the object to a predetermined position, wherein the operator moves the object to the predetermined position within a first predetermined period and pulls the object after the operator moves the object to the predetermined position; and the static gesture processing unit generating a first control command to control an electronic device according to at least one gesture determined by the object determination unit.

Another embodiment of the present invention provides a remote control system. The remote control system includes an object determination unit. The object determination unit is used for utilizing at least one of a gesture database, a color image of an object, and a two-dimensional image corresponding to a depth image including an operator to determine a gesture formed by the object when the operator moves the object to a predetermined position, wherein the operator moves the object to the predetermined position within a first predetermined period and pulls the object after the operator moves the object to the predetermined position.

The present invention provides a remote control system and a method of generating a control command according to at least one static gesture. The remote control system and the method utilize an object detection unit to detect a legal operation object corresponding to an operator according to a depth image including the operator and a face detection result corresponding to the operator, utilize an object determination unit to determine at least one gesture formed by the legal operation object, and utilize a static gesture processing unit to generate a control command to control an electronic device according to at least one gesture determined by the object determination unit. Therefore, compared to the prior art, the present invention has advantages as follows: first, the control command provided by the present invention is composed of at least one simple gesture, so the present invention does not need complicated gestures and operations; second, because the present invention does not need complicated gestures and operations, the present invention can provide a friendly operation method which can meet body mechanics of the operator; third, because the present invention does not need complicated gestures and operations, the present invention can provide a method for rapidly generating the control command; fourth, because the present invention does not need complicated gestures and operations, the remote control system provided by the present invention does not need a powerful processor and a large-capacity memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
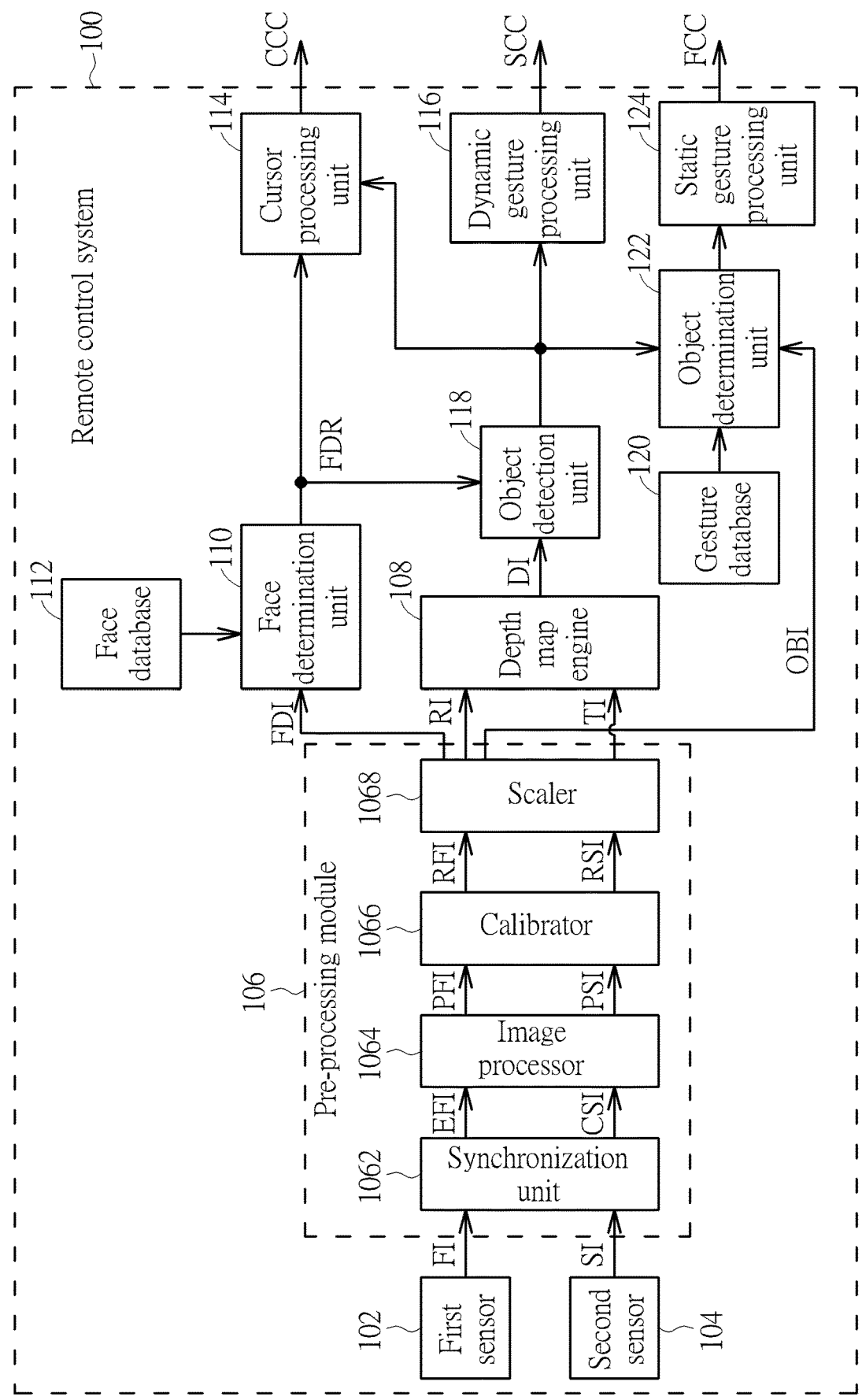
FIG. 1 is a diagram illustrating a remote control system according to an embodiment of the present invention.
Figure 2:
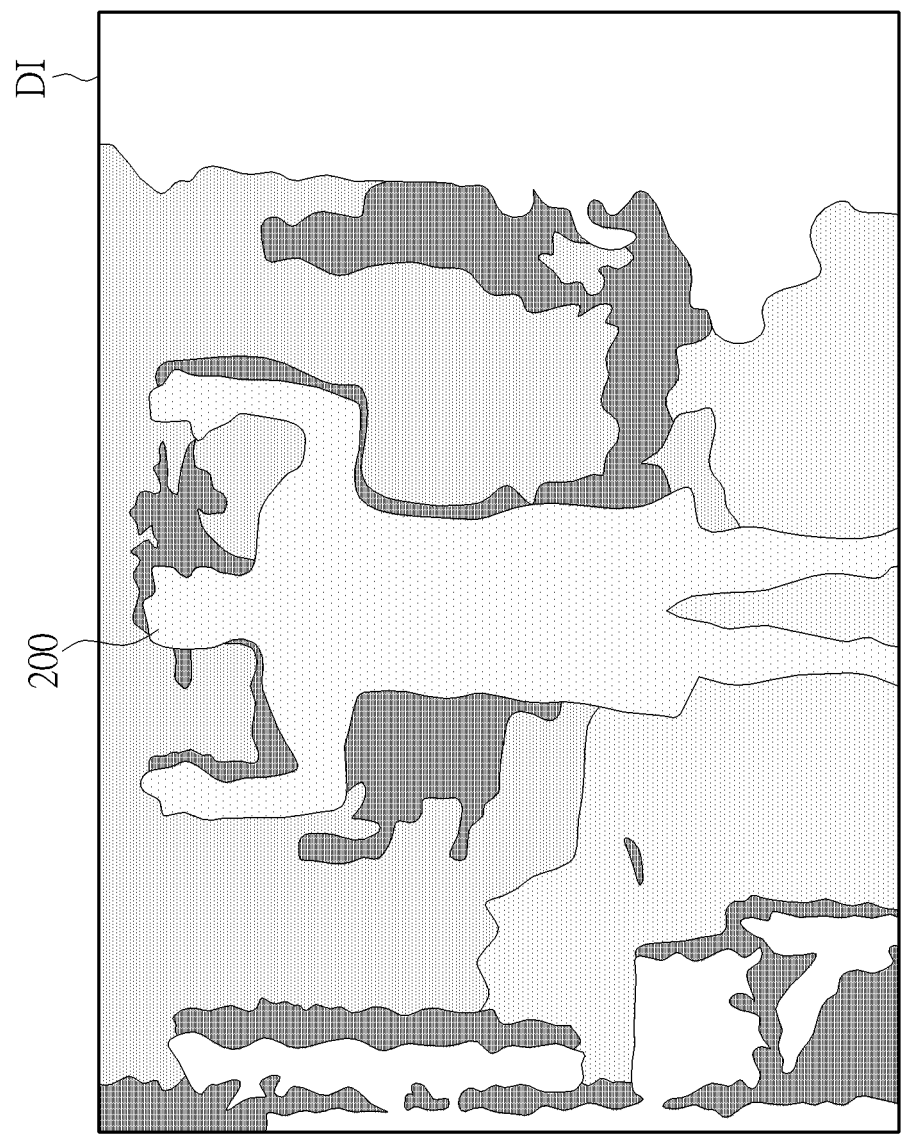
FIG. 2 is a diagram illustrating a depth image includes an operator.

Please refer to FIG. 1. FIG. 1 is a diagram illustrating a remote control system 100 according to an embodiment of the present invention. As shown in FIG. 1, the remote control system 100 includes a first sensor 102, a second sensor 104, a pre-processing module 106, a depth map engine 108, a face determination unit 110, a face database 112, a cursor processing unit 114, a dynamic gesture processing unit 116, an object detection unit 118, a gesture database 120, an object determination unit 122, and a static gesture processing unit 124, wherein the pre-processing module 106 includes a synchronization unit 1062, an image processor 1064, a calibrator 1066, and a scaler 1068, and the present invention is not limited to a sequence of the synchronization unit 1062, the image processor 1064, the calibrator 1066, and the scaler 1068 shown in FIG. 1. That is to say, the sequence of the synchronization unit 1062, the image processor 1064, the calibrator 1066, and the scaler 1068 shown in FIG. 1 can be changed, wherein the synchronization unit 1062 is coupled to the first sensor 102 and the second sensor 104, the image processor 1064 is coupled to the synchronization unit 1062, the calibrator 1066 is coupled to the image processor 1064, and the scaler 1068 is coupled to the calibrator 1066. As shown in FIG. 1, because the first sensor 102 is used for capturing a plurality of first images FI and the second sensor 104 is used for capturing a plurality of second images SI after the remote control system 100 is powered on, the synchronization unit 1062 can output a first synchronization signal to each first image EFI of the plurality of first images FI and a corresponding second synchronization signal to a second image CSI (corresponding to the first image EFI) of the plurality of second images SI (thus, the image processor 1064 can process the first image EFI and the second image CSI together according to the first synchronization signal and the corresponding second synchronization signal), wherein the plurality of first images FI are a plurality of left eye images, and the plurality of second images SI are a plurality of right eye images. After the image processor 1064 receives the first image EFI and the second image CSI, the image processor 1064 can simultaneously execute an image processing on the first image EFI and the second image CSI to generate a first processed image PFI and a second processed image PSI, respectively, wherein the image processing includes at least one of color space conversion, luminance adjustment, resolution adjustment, noise cancellation, edge enhancement, interpolation, and contrast adjustment. After the calibrator 1066 receives the first processed image PFI and the second processed image PSI, the calibrator 1066 can execute a calibration processing on the first processed image PFI and the second processed image PSI to generate a first rectified image RFI and a second rectified image RSI, respectively, wherein the calibration processing includes at least one of a color space calibration and an assembly calibration. The scaler 1068 is used for scaling the first rectified image RFI and the second rectified image RSI to generate images with different sizes (e.g. a reference image RI, a target image TI, a face determination image FDI, and an object determination image OBI), wherein a size of the face determination image FDI and a size of the object determination image OBI can be different from a size of the reference image RI. But, in another embodiment of the present invention, the face determination image FDI and the object determination image OBI are the reference image RI. As shown in FIG. 1, the depth map engine 108 is coupled to the pre-processing module 106, wherein after the depth map engine 108 receives the reference image RI and the target image TI, the depth map engine 108 generates a depth image DI includes an operator 200 (as shown in FIG. 2) according to the reference image RI and the target image TI. In addition, because how to determine a legal operator between a plurality of operator does not belong to the present invention, the present invention takes an operator as an example to describe the following embodiments of the present invention. In addition, as shown in FIG. 1, the face determination unit 110 can utilize the face determination image FDI and the face database 112 to generate a face detection result FDR corresponding to the operator 200, wherein the face detection result FDR of the operator 200 includes information of length, width, feature points, and positions corresponding to a face 202 of the operator 200, and the face database 112 can store the information of length, width, feature points, and positions corresponding to the face 202 of the operator 200. But, the present invention is not limited to the face detection result FDR of the operator 200 only including the information of length, width, feature points, and positions corresponding to the face 202 of the operator 200.

Figure 3:
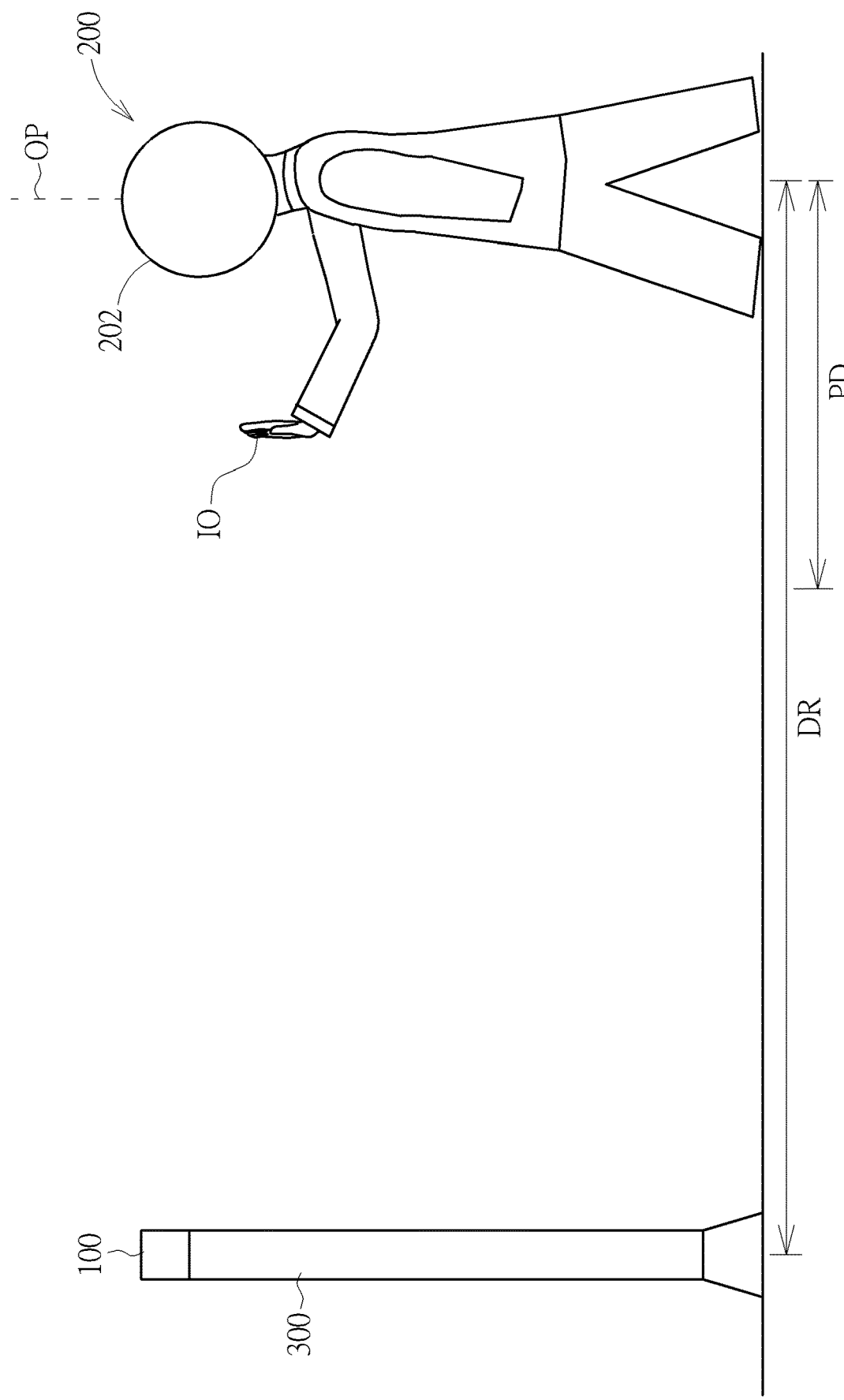
FIG. 3 is a diagram illustrating relationships between the operator, the remote control system, and the electronic device.

After the depth image DI and the face detection result FDR corresponding to the operator 200 are generated, the object detection unit 118 of the remote control system 100 can first determine a rough distance DR between the operator 200 and the remote control system 100 according to the depth image DI and the face detection result FDR corresponding to the operator 200 (as shown in FIG. 3, for example, the rough distance DR between the operator 200 and the remote control system 100 is 2 meters, wherein the remote control system 100 is installed above an electronic device 300 (e.g. a television)). But, the present invention is not limited to a position of the remote control system 100 shown in FIG. 3. That is to say, the remote control system 100 can also be integrated into the electronic device 300. After the object detection unit 118 determines the rough distance DR between the operator 200 and the remote control system 100, the object detection unit 118 can detect whether a legal operation object IO (e.g. a right hand of the operator 200) corresponding to the operator 200 exists around the operator 200 according to the rough distance DR (for example, the object detection unit 118 can detect whether the legal operation object IO exists within a predetermined distance PD in front of the operator 200). After the object detection unit 118 detects that legal operation object IO exists within the predetermined distance PD in front of the operator 200, the object detection unit 118 can provide information of a color image corresponding to the legal operation object IO, wherein the information of the color image of the legal operation object IO includes length, width, and depth of the legal operation object IO. But, the present invention is not limited to the information of the color image of the legal operation object IO including length, width, and depth of the legal operation object IO. In addition, in another embodiment of the present invention, after the object detection unit 118 detects that legal operation object IO exists within the predetermined distance PD in front of the operator 200, the object detection unit 118 can provide information of a grayscale image corresponding to the legal operation object IO, wherein the information of the grayscale image of the legal operation object IO includes length, width, and depth of the legal operation object IO. After the object detection unit 118 detects that legal operation object IO exists within the predetermined distance PD in front of the operator 200, the remote control system 100 can notice the operator 200 to start to operate the electronic device 300. For example, the remote control system 100 can utilize flash or control a display of the electronic device 300 to notice the operator 200 to start to operate the electronic device 300.

Figure 4:
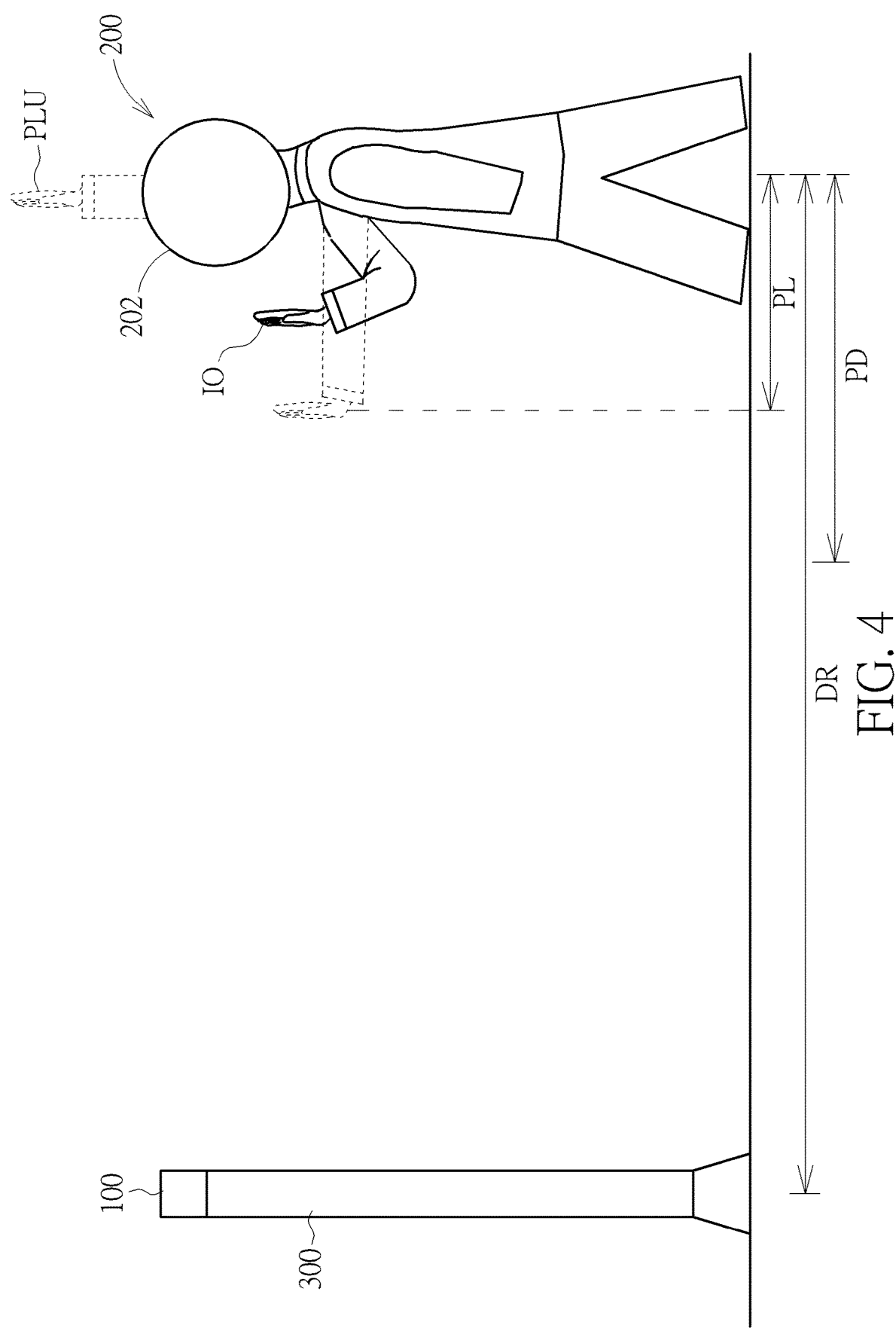
FIG. 4 is a diagram illustrating the operator moving the legal operation object forward to the predetermined position within the first predetermined period.

Taking the legal operation object IO being in front of the operator 200 as an example, after the remote control system 100 notices the operator 200 to start to operate the electronic device 300, the operator 200 moves the legal operation object IO forward to a predetermined position PL (as shown in FIG. 4) within a first predetermined period and pulls the legal operation object IO after the operator 200 moves the legal operation object IO to the predetermined position PL, wherein as shown in FIG. 4, when the legal operation object IO is located at the predetermined position PL, a minimum distance exists between the legal operation object IO and the remote control system 100. But, the present invention is not limited to the minimum distance existing between the legal operation object IO and the remote control system 100 when the legal operation object IO is located at the predetermined position PL. That is to say, any configuration in which a distance between the legal operation object IO and the remote control system 100 is less than a distance between the operator 200 and the remote control system 100 (that is, the rough distance DR between the operator 200 and the remote control system 100) when the legal operation object IO is located at the predetermined position PL falls within the scope of the present invention. In addition, the present invention is not limited to the operator 200 moving the legal operation object IO forward to the predetermined position PL within the first predetermined period. That is to say, in another embodiment of the present invention, the operator 200 can move the legal operation object IO upward to another predetermined position PLU (as shown in FIG. 4) within the first predetermined period. In addition, in another embodiment of the present invention, the operator 200 can also move the legal operation object IO downward to another predetermined position within the first predetermined period.

Figure 5:
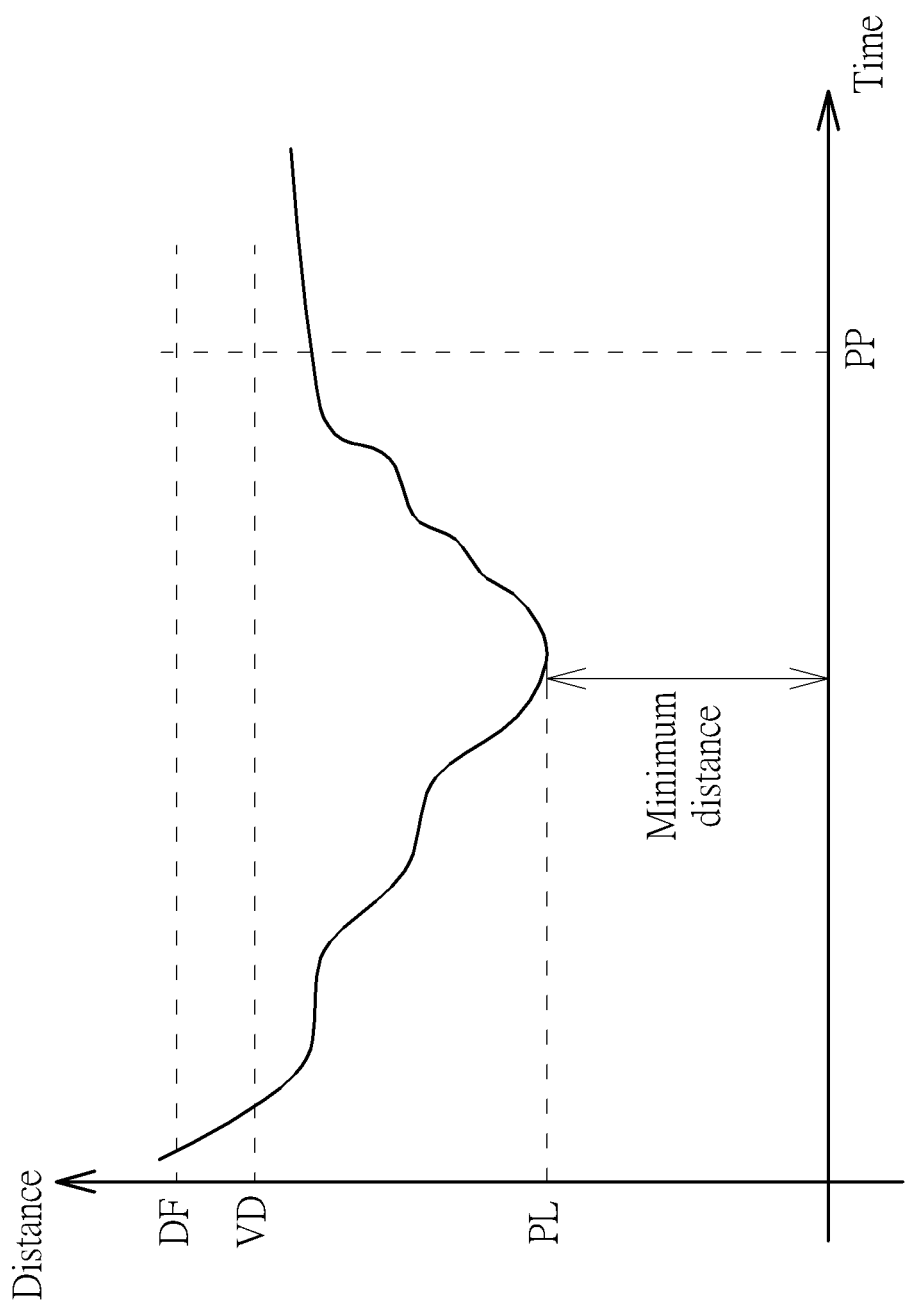
FIG. 5 is a diagram illustrating a motion trajectory of the legal operation object moved by the operator.
Figure 6:
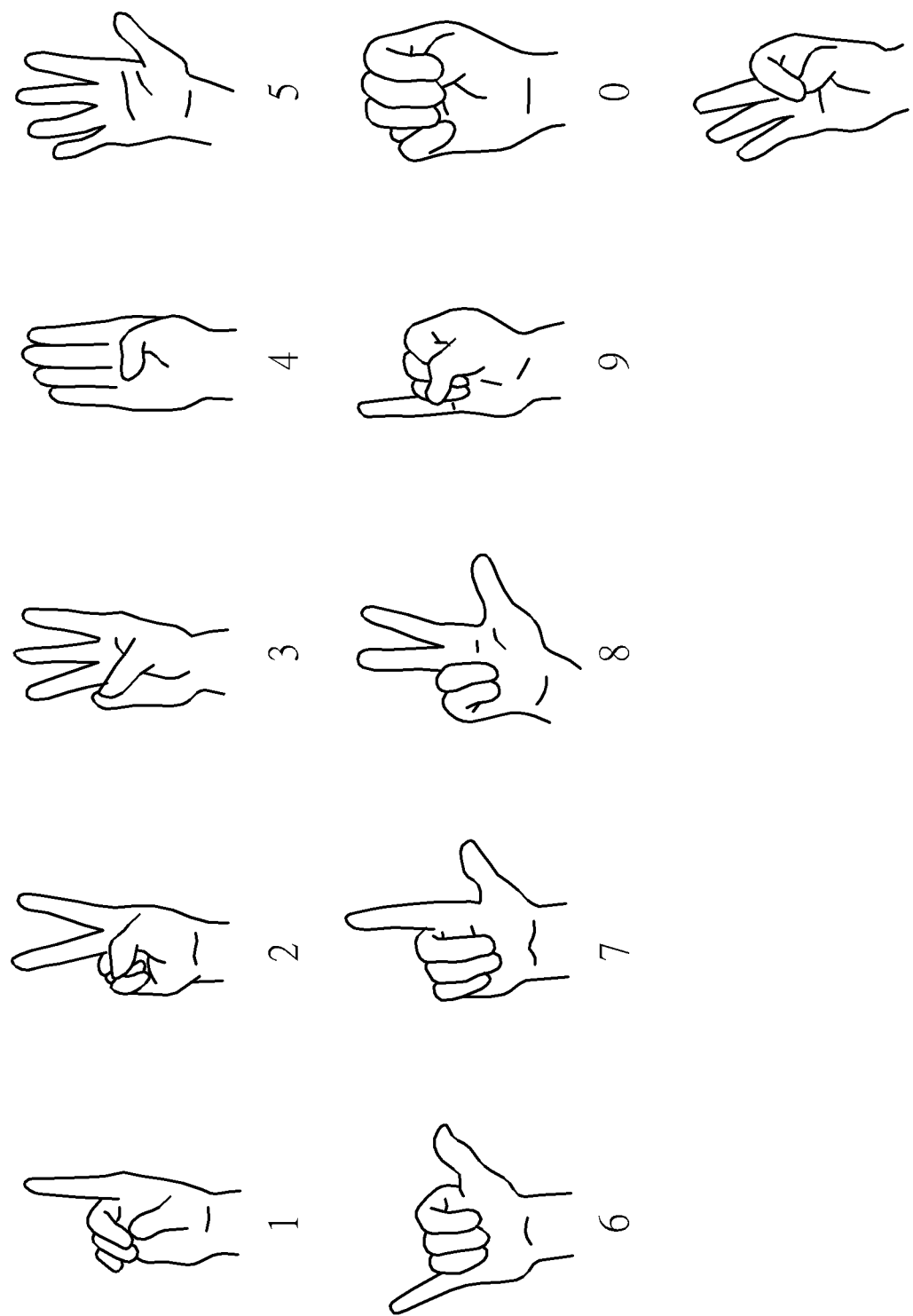
FIG. 6 is a diagram illustrating a plurality of gestures formed by the legal operation object.

Because when the operator 200 watches the electronic device 300, the operator 200 may arbitrarily move the legal operation object IO (thus, a motion of the operator 200 arbitrarily moving the legal operation object IO may make the object determination unit 122 be confused), the object determination unit 122 can determine that a motion of the operator 200 moving the legal operation object IO shown in FIG. 4 (that is, the operator 200 moves the legal operation object IO forward to the predetermined position PL within the first predetermined period and pulls the legal operation object IO after the operator 200 moves the legal operation object IO to the predetermined position PL) is an effective motion. Please refer to FIG. 5. FIG. 5 is a diagram illustrating a motion trajectory of the legal operation object IO moved by the operator 200, wherein a vertical axis of FIG. 5 represents the distance between the legal operation object IO and the remote control system 100, a horizontal axis of FIG. 5 represents time, DF represents a distance between the face 202 of the operator 200 and the remote control system 100, and PP represents the first predetermined period. As shown in FIG. 5, after the remote control system 100 notices the operator 200 to start to operate the electronic device 300, the operator 200 moves the legal operation object IO forward to the predetermined position PL within the first predetermined period PP and pulls the legal operation object IO after the operator 200 moves the legal operation object IO to the predetermined position PL, so the distance between the legal operation object IO and the remote control system 100 is gradually reduced to the predetermined position PL and then is gradually increased. Therefore, after the distance between the legal operation object IO and the remote control system 100 is less than an effective distance VD (wherein the effective distance VD can be determined by the distance DF between the face 202 of the operator 200 and the remote control system 100), the object determination unit 122 can utilize at least one of the gesture database 120, the color image of the legal operation object IO (or the grayscale image of the legal operation object IO), and a two-dimensional image (e.g. the object determination image OBI, but the present invention is not limited to the two-dimensional image being the object determination image OBI) corresponding to the depth image DP to determine a gesture formed by the legal operation object IO when the legal operation object IO is located at the predetermined position PL. Please refer to FIG. 6. FIG. 6 is a diagram illustrating a plurality of gestures formed by the legal operation object IO. As shown in FIG. 6, when the legal operation object IO is located at the predetermined position PL, the object determination unit 122 can determine the gestures formed by the legal operation object IO corresponding to numbers 0-9 and confirmation, respectively, wherein when the legal operation object IO is located at the predetermined position PL, the legal operation object IO needs to complete gestures which the operator 200 wants to form. But, the present invention is not limited to the legal operation object IO only forming the gestures corresponding to numbers 0-9 and confirmation respectively when the legal operation object IO is located at the predetermined position PL. That is to say, the legal operation object IO can still form gestures having other predetermined meanings.

Figure 7:
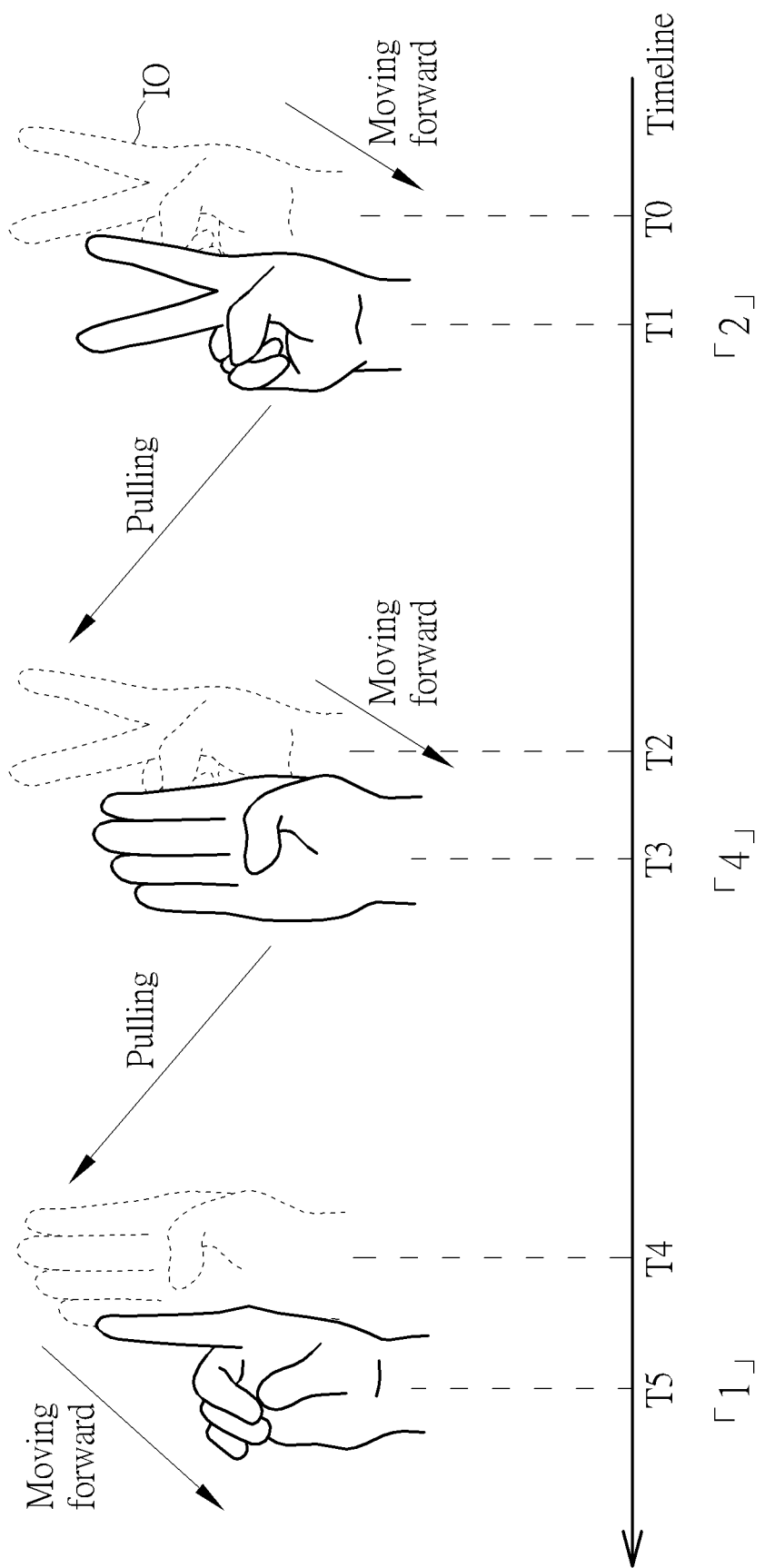
FIG. 7 is a diagram illustrating the static gesture processing unit generating a first control command according to at least one gesture determined by the object determination unit.

Please refer to FIG. 7. FIG. 7 is a diagram illustrating the static gesture processing unit 124 generating a first control command FCC according to at least one gesture determined by the object determination unit 122. As shown in FIG. 7, at a time T1, the operator 200 moves the legal operation object IO forward from an initiation position (corresponding to a time T0) of the legal operation object IO to the predetermined position PL (corresponding to the time T1). Meanwhile, the object determination unit 122 determines that a gesture formed by the legal operation object IO represents number "2"; at a time T2, the operator 200 pulls the legal operation object IO from the predetermined position PL; at a time T3, the operator 200 moves the legal operation object IO forward to the predetermined position PL again. Meanwhile, the object determination unit 122 determines that a gesture formed by the legal operation object IO represents number "4"; at a time T4, the operator 200 pulls the legal operation object IO from the predetermined position PL again; at a time T5, the operator 200 moves the legal operation object IO forward to the predetermined position PL again. Meanwhile, the object determination unit 122 determines that a gesture formed by the legal operation object IO represents number "1", wherein each of the gestures (that is, numbers "2", "4", "1" shown in FIG. 7) formed by the legal operation object IO needs to be completed within the first predetermined period PP shown in FIG. 5. For example, a time interval (that is, the time T0-T1) for the object determination unit 122 determining number "2" shown in FIG. 7, a time interval (that is, the time T2-T3) for the object determination unit 122 determining number "4" shown in FIG. 7, and a time interval (that is, the time T4-T5) for the object determination unit 122 determining number "1" shown in FIG. 7 are less than or equal to the first predetermined period PP. In addition, a time interval between each of the gestures (that is, numbers "2", "4", "1" shown in FIG. 7) formed by the legal operation object IO and a next gesture formed by the legal operation object IO is less than or equal to a predetermined time T (e.g. 2 seconds). That is to say, a time interval between the time T1-T2 and a time interval between the time T3-T4 is less than or equal to the predetermined time T. But, the present invention is not limited to the predetermined time T being 2 seconds. If after the time T5, the legal operation object IO does not form a new gesture again within the predetermined time T (e.g. 2 seconds), because the object determination unit 122 has determined numbers "2", "4", "1" according to the above mentioned gestures formed by the legal operation object IO during the time T1-T5, the static gesture processing unit 124 can generate the first control command FCC to control the electronic device 300 according to numbers "2", "4", "1". For example, the first control command FCC can control the electronic device 300 to switch to a predetermined channel (e.g. a channel 241). In addition, if after the time T5, the operator 200 makes the legal operation object IO form a gesture representing "confirmation" within the predetermined time T, because before the gesture representing "confirmation", the object determination unit 122 has determined numbers "2", "4", "1" according to the gestures formed by the legal operation object IO during the time T1-T5, the static gesture processing unit 124 can also generate the first control command FCC to control the electronic device 300 according to numbers "2", "4", "1". For example, the first control command FCC can control the electronic device 300 to switch to the predetermined channel (e.g. the channel 241). In addition, as shown in FIG. 4, because the object determination unit 122 determines a gesture formed by the legal operation object IO when the operator 200 moves the legal operation object IO forward to the predetermined position PL (that is, the legal operation object IO has significant variation of Z coordinate relative to a plane OP where the face 202 of the operator 200 is located), the object determination unit 122 can neglect a gesture formed by the legal operation object IO when the legal operation object IO has significant variations of X, Y coordinates relative to the plane OP where the face 202 of the operator 200 is located. In addition, if the object determination unit 122 does not determine another gesture formed by the legal operation object IO within the predetermined time T after the object determination unit 122 determines a gesture formed by the legal operation object IO, the static gesture processing unit 124 can generate a corresponding control command to control the electronic device 300 according to at least one number represented by at least one gesture formed by the legal operation object IO currently determined by the object determination unit 122. In addition, the static gesture processing unit 124 may also not generate another corresponding control command according to the at least one number represented by the at least one gesture formed by the legal operation object IO currently determined by the object determination unit 122 (because the at least one number represented by the at least one gesture formed by the legal operation object IO currently determined by the object determination unit 122 does not correspond to any control command).

Figure 8:
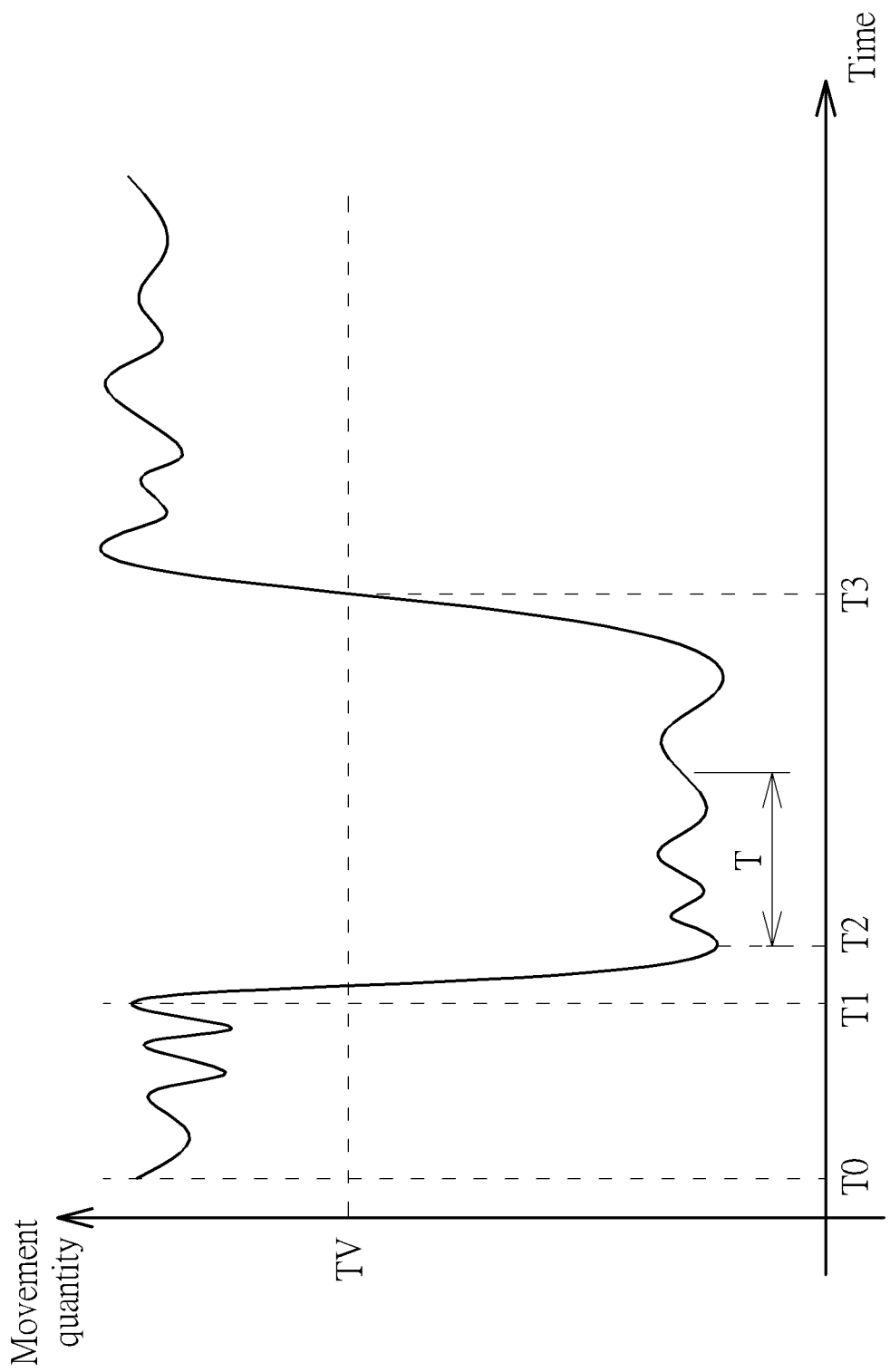
FIG. 8 is a diagram illustrating the object determination unit utilizing movement quantity of the legal operation object to determine gestures formed by the legal operation object.

In addition, please refer to FIG. 8. FIG. 8 is a diagram illustrating the object determination unit 122 utilizing movement quantity of the legal operation object IO to determine gestures formed by the legal operation object IO, wherein a vertical axis of FIG. 8 represents the movement quantity of the legal operation object IO, and a horizontal axis of FIG. 8 represents time. As shown in FIG. 8, during a time T0 to a time T1, the movement quantity of the legal operation object IO is greater than a threshold value TV. For example, the operator 200 moves the legal operation object IO forward to make the movement quantity of the legal operation object IO be greater than the threshold value TV. During the time T1 to a time T2, the movement quantity of the legal operation object IO is reduced to be less than the threshold value TV. If after the time T2, the legal operation object IO is static over the predetermined time T, the object determination unit 122 starts to determine a gesture formed by the legal operation object IO. In addition, when the movement quantity of the legal operation object IO is greater than the threshold value TV (at a time T3) again, the object determination unit 122 can determine another gesture formed by the legal operation object IO again according to the above mentioned operation principles.

Figure 9:
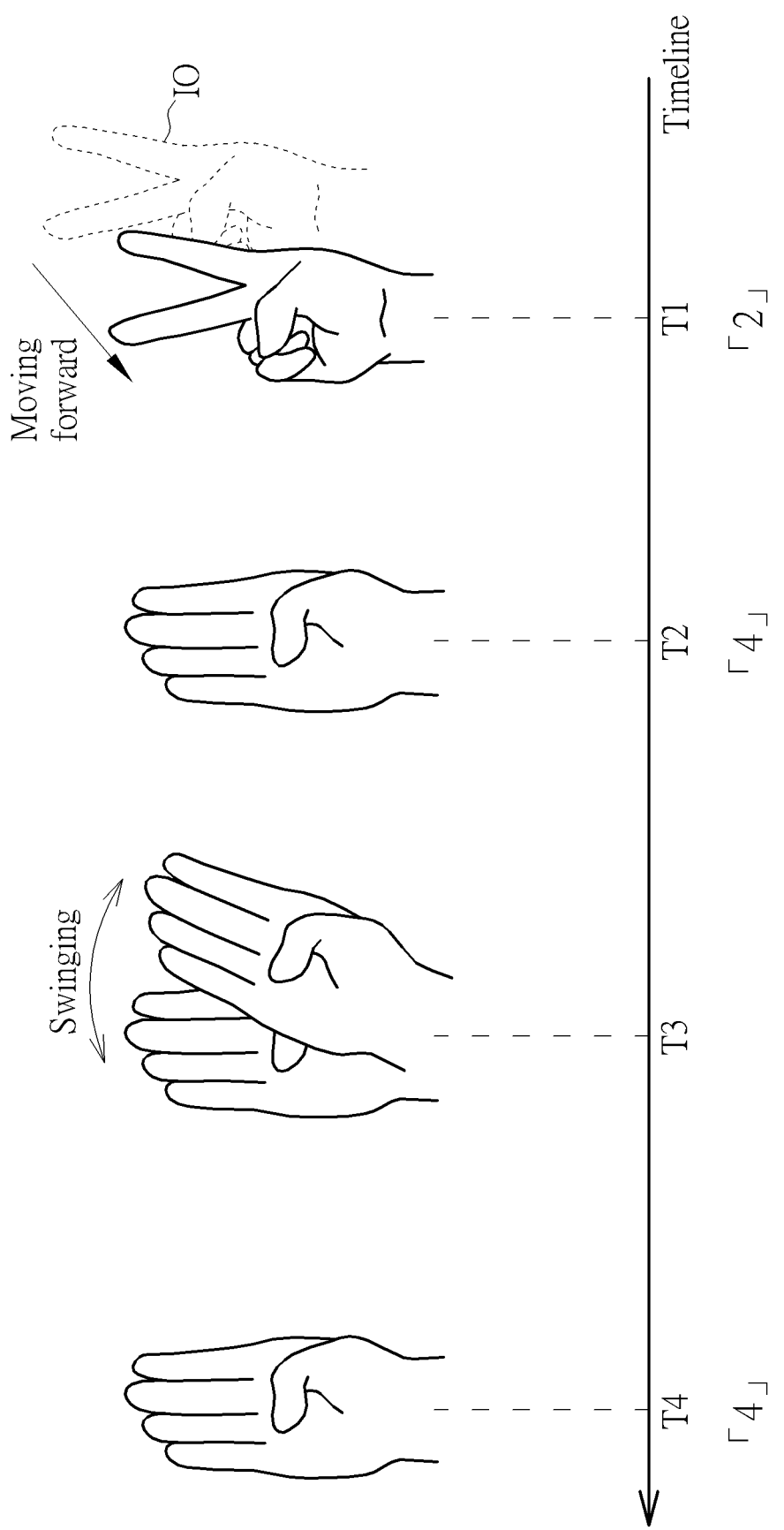
FIG. 9 is a diagram illustrating the static gesture processing unit generating the first control command according to gestures determined by the object determination unit.

Please refer to FIG. 9. FIG. 9 is a diagram illustrating the static gesture processing unit 124 generating the first control command FCC according to gestures determined by the object determination unit 122. As shown in FIG. 9, after the operator 200 moves the legal operation object IO forward, the legal operation object IO is static over the predetermined time T. Meanwhile, (that is, at a time T1) the object determination unit 122 determines that a gesture formed by the legal operation object IO represents number "2"; during the time T1 to a time T2, after the operator 200 changes a previous gesture (that is, the gesture formed by the legal operation object IO representing number "2") formed by the legal operation object IO to make the movement quantity of the legal operation object IO be greater than the threshold value TV, the legal operation object IO is static over the predetermined time T again. Meanwhile, (that is, at the time T2) the object determination unit 122 determines that a gesture formed by the legal operation object IO represents number "4"; at a time T3, the operator 200 swings the legal operation object IO to make the movement quantity of the legal operation object IO be greater than the threshold value TV; after the operator 200 swings the legal operation object IO to make the movement quantity of the legal operation object IO be greater than the threshold value TV, the legal operation object IO is static over the predetermined time T again. Meanwhile, (that is, at a time T4) the object determination unit 122 determines that a gesture formed by the legal operation object IO represents number "4". In FIG. 9, because the object determination unit 122 has determined numbers "2", "4", "4" according to the above mentioned gestures formed by the legal operation object IO during the time T1-T4, the static gesture processing unit 124 can generate the first control command FCC to control the electronic device 300 to switch to another predetermined channel (e.g. a channel 244) according to numbers "2", "4", "4". Therefore, in FIG. 9, as long as the operator 200 makes the legal operation object IO be static over the predetermined time T after the movement quantity of the legal operation object IO is greater than the threshold value TV, the object determination unit 122 can start to determine a gesture formed by the legal operation object IO.

Figure 10:
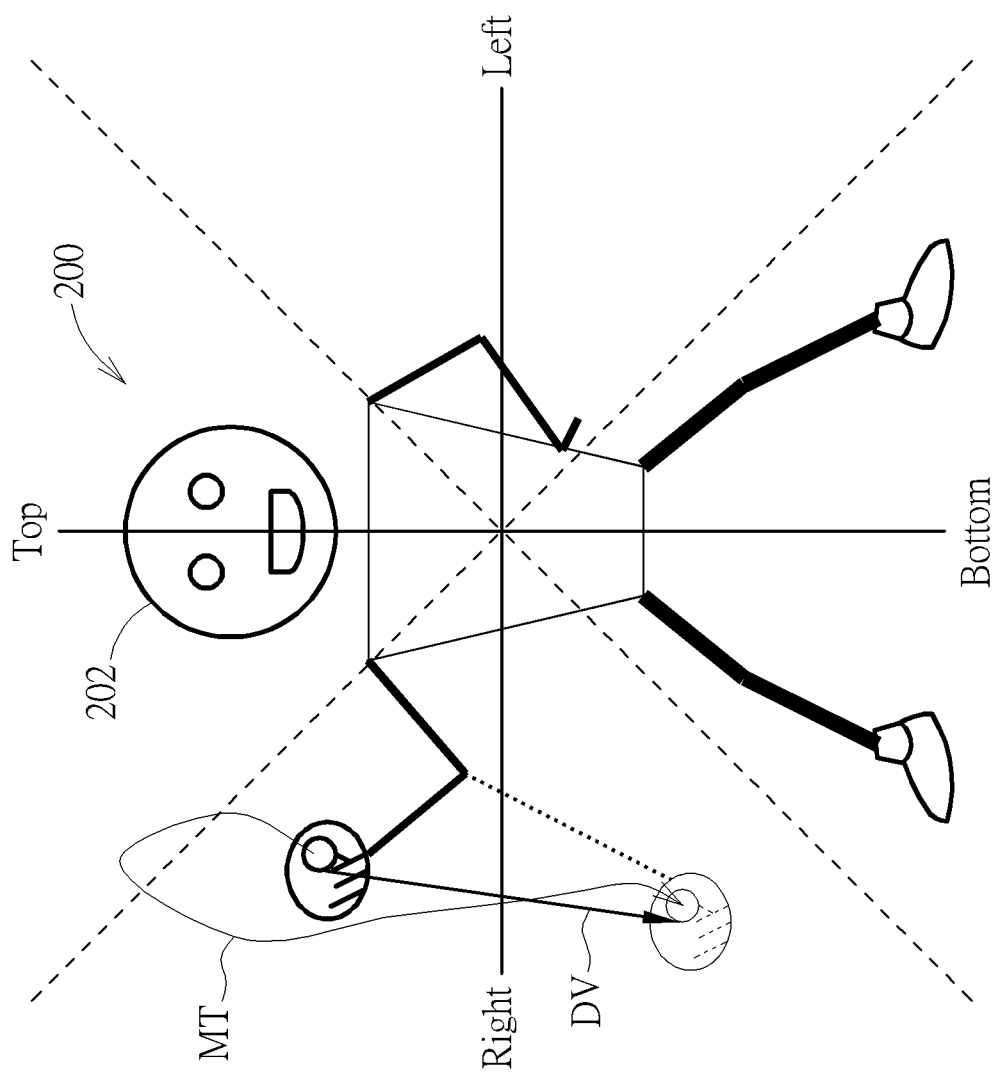
FIG. 10 is a diagram illustrating the operator moving the legal operation object downward.
Figure 11:
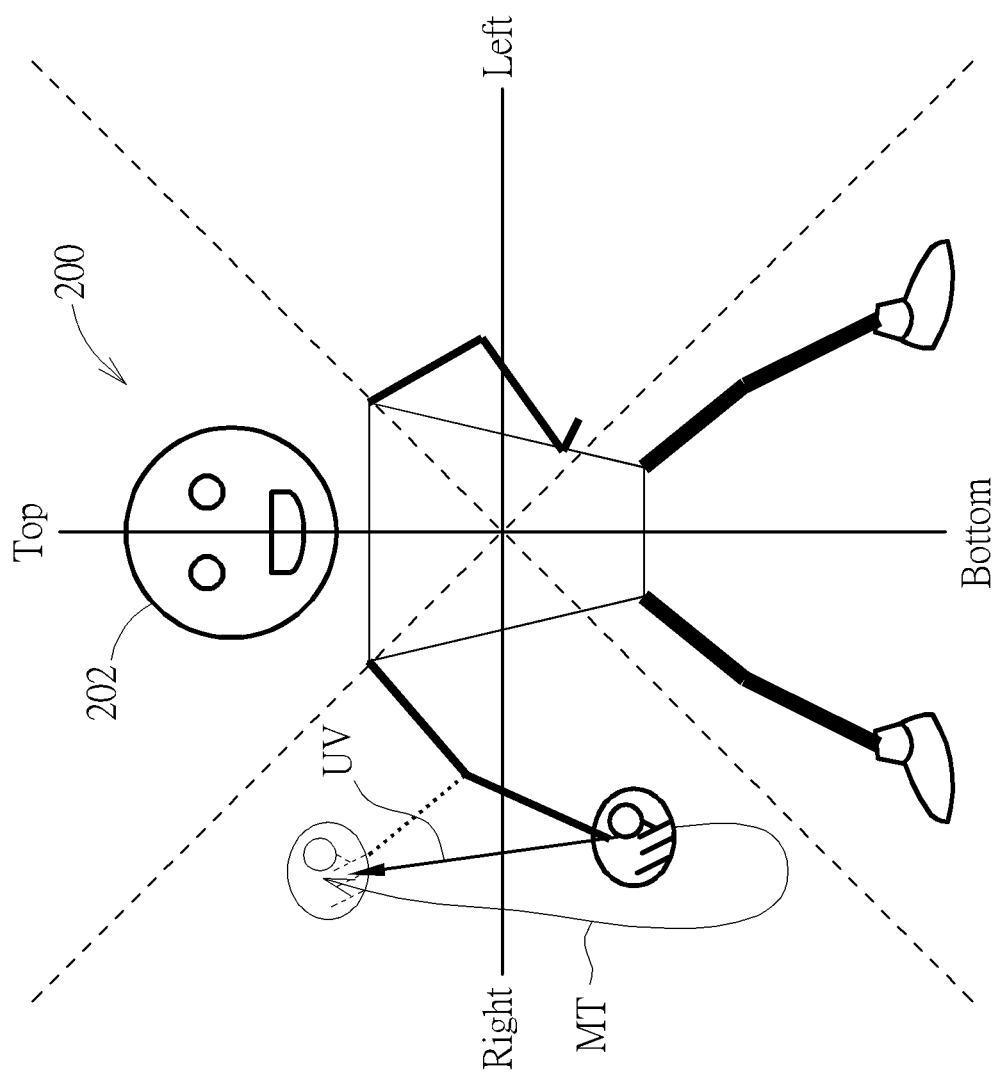
FIG. 11 is a diagram illustrating the operator moving the legal operation object upward.
Figure 12:
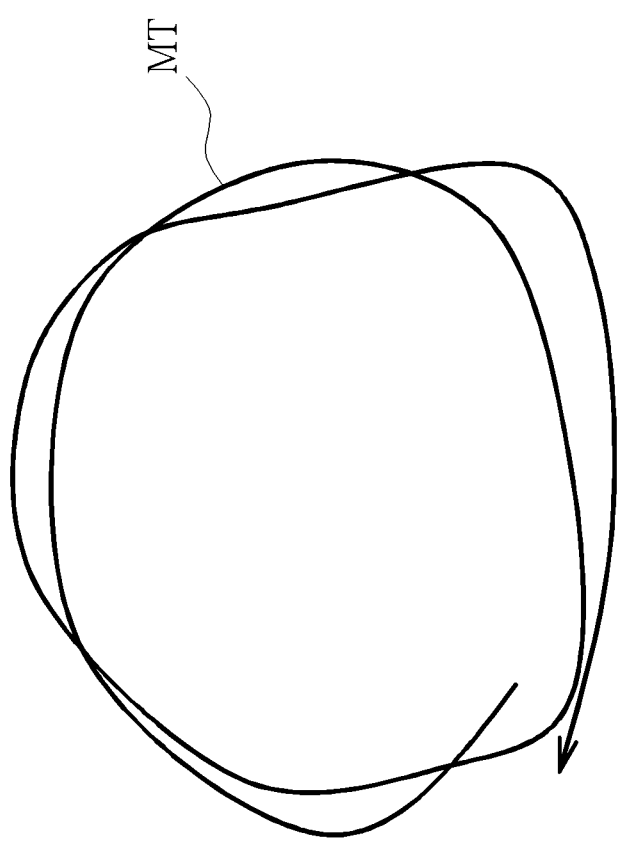
FIG. 12 is a diagram illustrating the operator moving the legal operation object in a circle trajectory way.

In addition, the present invention further provides control commands corresponding to dynamic gestures. As shown in FIG. 1, the dynamic gesture processing unit 116 is coupled to the object detection unit 118. As shown in FIG. 4, because the object determination unit 122 determines a gesture formed by the legal operation object IO when the operator 200 moves the legal operation object IO forward to the predetermined position PL (that is, the object determination unit 122 determines a gesture formed by the legal operation object IO after the legal operation object IO has significant variation of Z coordinate relative to the plane OP where the face 202 of the operator 200 is located), the dynamic gesture processing unit 116 needs to generate a second control command SCC to control the electronic device 300 according to a motion trajectory of the legal operation object IO within a second predetermined period when the legal operation object IO has significant variations of X, Y coordinates relative to the plane OP. That is to say, the object determination unit 122 and the dynamic gesture processing unit 116 cannot simultaneously execute a corresponding operation according to a same coordination variation of the legal operation object IO relative to the plane OP. Please refer to FIGS. 10, 11. FIG. 10 is a diagram illustrating the operator 200 moving the legal operation object IO downward, and FIG. 11 is a diagram illustrating the operator 200 moving the legal operation object IO upward, wherein left/right directions of the depth image DI generated by the depth map engine 108 mirror left/right directions of the operator 200. As shown in FIG. 10, when the operator 200 moves the legal operation object IO within the second predetermined period, the dynamic gesture processing unit 116 determines that the operator 200 moves the legal operation object IO downward according to a motion trajectory MT (shown in FIG. 10) of the legal operation object IO within the second predetermined period (wherein the motion trajectory MT (shown in FIG. 10) of the legal operation object IO within the second predetermined period forms a downward vector DV), so the dynamic gesture processing unit 116 can generate the corresponding second control command SCC to control the electronic device 300 according to the downward vector DV (for example, the second control command SCC can control the electronic device 300 to switch to a previous channel corresponding to a current playing channel from the current playing channel). That is to say, within the second predetermined period, the legal operation object IO starts to have significant variations of X, Y coordinates relative to the plane OP until the legal operation object IO is static for a period of time, or the legal operation object IO disappears (for example, the operator 200 pulls the legal operation object IO to make the legal operation object IO disappear in an image capture range of the remote control system 100). As shown in FIG. 11, when the operator 200 moves the legal operation object IO within the second predetermined period, the dynamic gesture processing unit 116 determines that the operator 200 moves the legal operation object IO upward according to the motion trajectory MT (shown in FIG. 11) of the legal operation object IO within the second predetermined period (wherein the motion trajectory MT (shown in FIG. 11) of the legal operation object IO within the second predetermined period forms an upward vector UV), so the dynamic gesture processing unit 116 can generate the corresponding second control command SCC to control the electronic device 300 according to the upward vector UV (for example, the second control command SCC can control the electronic device 300 to switch to a next channel corresponding to the current playing channel from the current playing channel). In addition, when the motion trajectory MT of the legal operation object IO within the second predetermined period forms a leftward vector, the dynamic gesture processing unit 116 can generate the corresponding second control command SCC to control the electronic device 300 according to the leftward vector (for example, current playing volume of the electronic device 300 is increased according to the leftward vector); when the motion trajectory MT of the legal operation object IO within the second predetermined period forms a rightward vector, the dynamic gesture processing unit 116 can generate the corresponding second control command SCC to control the electronic device 300 according to the rightward vector (for example, the current playing volume of the electronic device 300 is decreased according to the rightward vector). In addition, please refer to FIG. 12. FIG. 12 is a diagram illustrating the operator 200 moving the legal operation object IO in a circle trajectory way. As shown in FIG. 12, when the operator 200 moves the legal operation object IO in the circle trajectory way within the second predetermined period, the dynamic gesture processing unit 116 can generate the corresponding second control command SCC to control the electronic device 300 according to the motion trajectory MT (shown in FIG. 12) of the legal operation object IO within the second predetermined period (for example, the motion trajectory MT (shown in FIG. 12) of the legal operation object IO within the second predetermined period forms two circle trajectories). For example, the electronic device 300 is powered off or powered on according to the motion trajectory MT (shown in FIG. 12) of the legal operation object IO. In addition, the present invention is not limited to corresponding relationships between the above mentioned second control command SCC and the motion trajectory MT (shown in FIGS. 10-12) of the legal operation object IO.

In addition, the remote control system 100 further provides a learning function. When the operator 200 enters the learning function of the remote control system 100, the operator 200 can make the remote control system 100 learn gestures which the operator 200 wants to change or gestures which the operator 200 wants to add. After the remote control system 100 learns the gestures which the operator 200 wants to change or the gestures which the operator 200 wants to add, the remote control system 100 can store the gestures which the operator 200 wants to change or the gestures which the operator 200 wants to add into to a memory of the remote control system 100.

Figure 13:
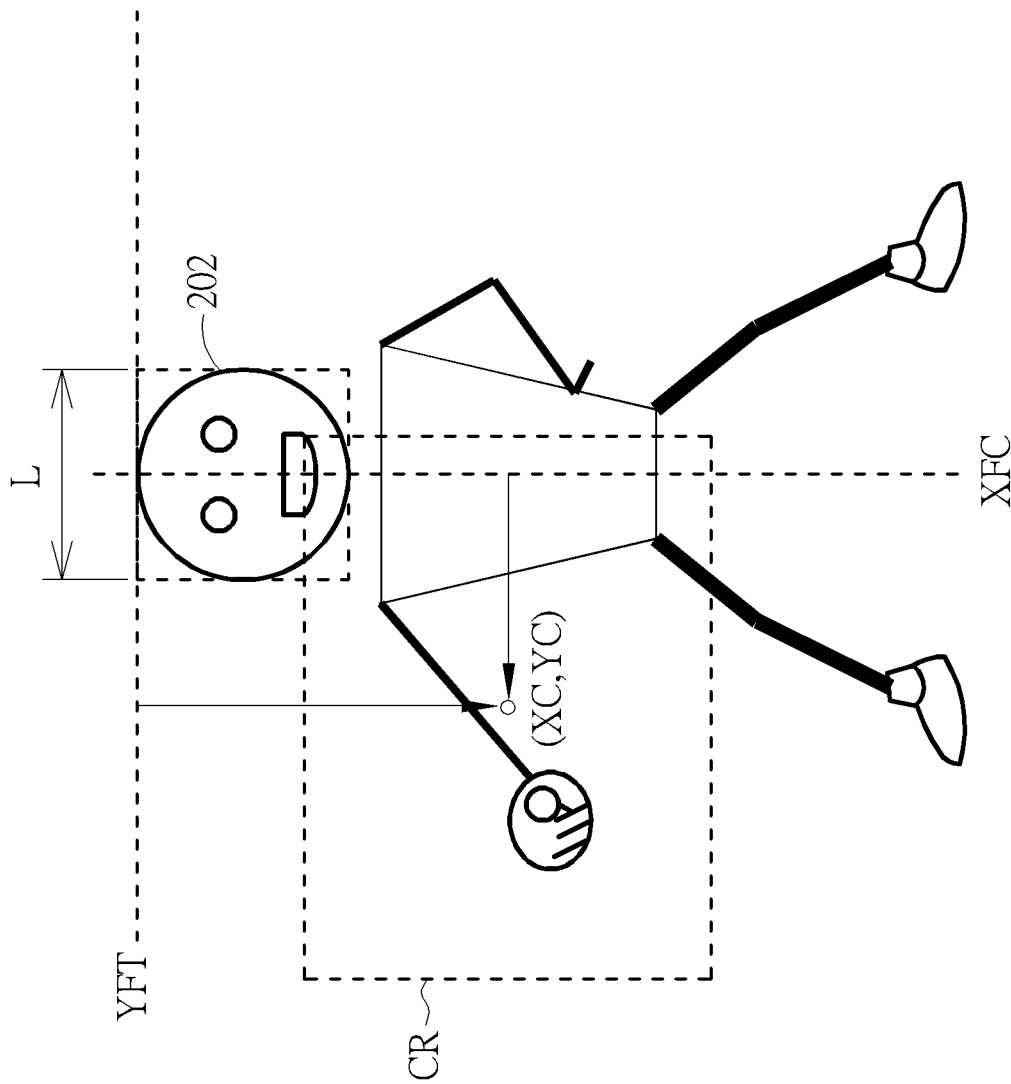
FIG. 13 is a diagram illustrating a cursor operation range corresponding to a one-hand control mode of the cursor mode.

In addition, the present invention further provides control commands corresponding to a cursor mode. As shown in FIG. 1, the cursor processing unit 114 is coupled to the face determination unit 110. After the face determination unit 110 utilizes the face determination image FDI and the face database 112 to generate the face detection result FDR corresponding to the operator 200, because the face detection result FDR of the operator 200 includes the information of length, width, feature points, and positions corresponding to the face 202 of the operator 200, the cursor processing unit 114 can define a centerline XFC of the face 202 of the operator 200 (as shown in FIG. 13) according to the face detection result FDR, wherein FIG. 13 is a diagram illustrating a cursor operation range CR corresponding to a one-hand control mode of the cursor mode. As shown in FIG. 13, width of the face 202 of the operator 200 is represented as L and a vertex of the face 202 of the operator 200 is represented as YFT. If the operator 200 is used to use a right hand thereof, the cursor processing unit 114 can utilize equation (1) and equation (2) to find a coordinate (XC, YC) of a center corresponding to a display of the electronic device 300 within the cursor operation range CR of the operator 200 corresponding to the one-hand control mode of the cursor mode, wherein FratioH, FratioV are predetermined proportions:

$$XC=XFC-(L*FratioH) \quad (1)$$

$$YC=YFT-(L*FratioV) \quad (2)$$

In addition, the cursor processing unit 114 can define the cursor operation range CR according to equation (1) and equation (2), wherein a horizontal range of the cursor operation range CR is $XC\pm(L*FratioH)$ and a vertical range of the cursor operation range CR is $YC\pm(L*FratioV)$. After the cursor processing unit 114 defines the cursor operation range CR, the cursor processing unit 114 can generate a cursor control command CCC to control the electronic device 300 according to a position of the legal operation object IO. In addition, in another embodiment of the present invention, the cursor processing unit 114 can calculate the cursor operation range CR according to a depth of the face 202 of the operator 200 in the depth image DI and a corresponding proportion. In addition, if the operator 200 is used to use a left hand thereof, a cursor operation range corresponding to the left hand of the operator 200 can be defined by the above mentioned method, so further description thereof is omitted for simplicity.

Figure 14:
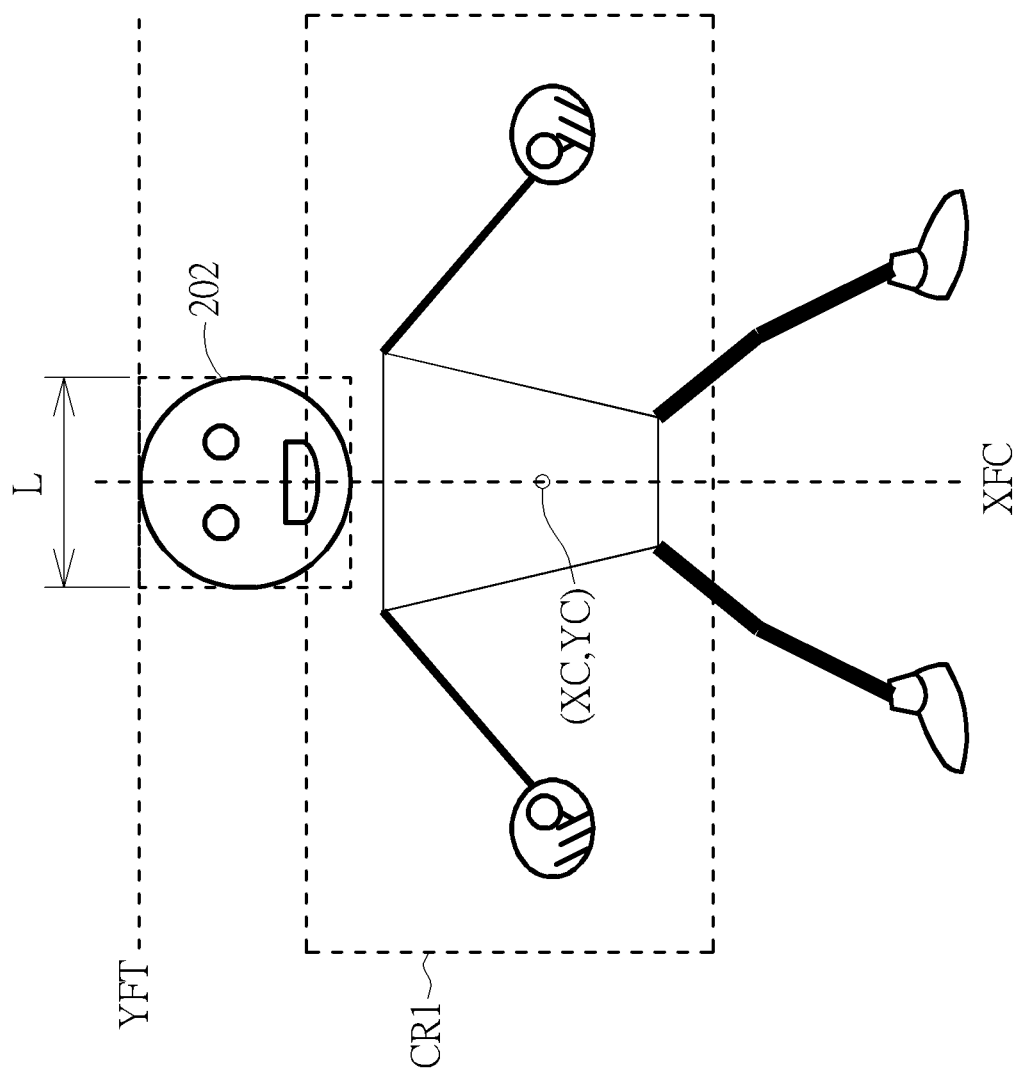
FIG. 14 is a diagram illustrating a cursor operation range corresponding to a two-hand control mode of the cursor mode.

In addition, please refer to FIG. 14. FIG. 14 is a diagram illustrating a cursor operation range CR1 corresponding to a two-hand control mode of the cursor mode. As shown in FIG. 14, the cursor processing unit 114 can define the centerline XFC (as shown in FIG. 14) of the face 202 of the operator 200 according to the face detection result FDR, wherein the width of the face 202 of the operator 200 is represented as L and the vertex of the face 202 of the operator 200 is represented as YFT. Therefore, the cursor processing unit 114 can utilize equation (2) and equation (3) to find a coordinate (XC, YC) of a center corresponding to the display of the electronic device 300 within the cursor operation range CR1 of the operator 200 corresponding to the two-hand control mode of the cursor mode:

$$XC=XFC \quad (3)$$

In addition, the cursor processing unit 114 can define the cursor operation range CR1 according to equation (2) and equation (3), wherein a horizontal range of the cursor operation range CR1 is $XC\pm2*(L*FratioH)$ and a vertical range of the cursor operation range CR1 is $YC\pm(L*FratioV)$. In addition, in another embodiment of the present invention, the cursor processing unit 114 can calculate the cursor operation range CR1 according to the depth of the face 202 of the operator 200 in the depth image DI and the corresponding proportion.

Figure 15:
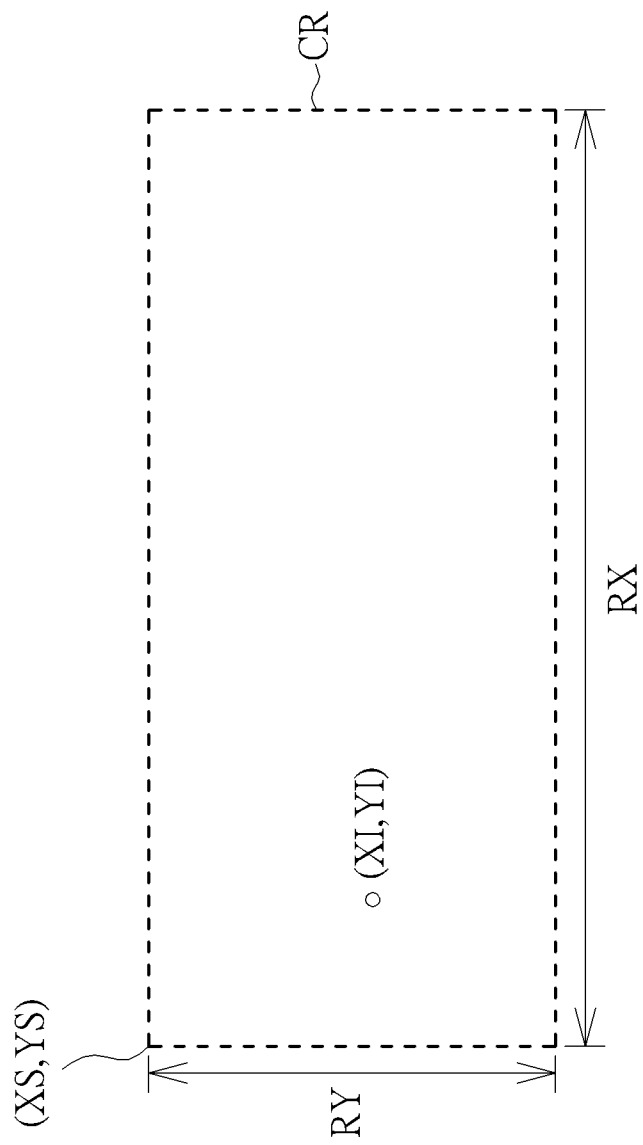
FIG. 15 is a diagram illustrating a coordinate of the legal operation object within the cursor operation range after the cursor processing unit defines the cursor operation range.

Please refer to FIG. 15. FIG. 15 is a diagram illustrating a coordinate (XI, YI) of the legal operation object IO within the cursor operation range CR after the cursor processing unit 114 defines the cursor operation range CR. As shown in FIG. 15, if the coordinate of the legal operation object IO within the cursor operation range CR is (XI, YI), a coordinate of an upper left corner of the cursor operation range CR is (XS, YS), width and height of the cursor operation range CR are RX, RY respectively, and width and height of the display of the electronic device 300 are W, H respectively, the cursor processing unit 114 can generate a coordinate (X, Y) of a cursor displayed on the display of the electronic device 300 corresponding to the legal operation object IO according to the coordinate (XI, YI) of the legal operation object IO, equation (4), and equation (5):

$$X=W-((XI-XS)*W/RX) \quad (4)$$

$$Y=(YI-YS)*H/RY \quad (5)$$

In addition, because the display of the electronic device 300 and the face 202 of the operator 200 face each other, left/right directions of the position of the legal operation object IO will mirror left/right directions of the coordinate (X, Y) of the cursor displayed on the display of the electronic device 300. In addition, because a refresh frequency of the display of the electronic device 300 is usually greater than a frequency of the remote control system 100 capturing images, the cursor processing unit 114 can further utilize a filter or an interpolation method to reduce jitters of the cursor displayed on the display of the electronic device 300 and increase smoothness of a trajectory of the cursor displayed on the display of the electronic device 300.

Figure 16:
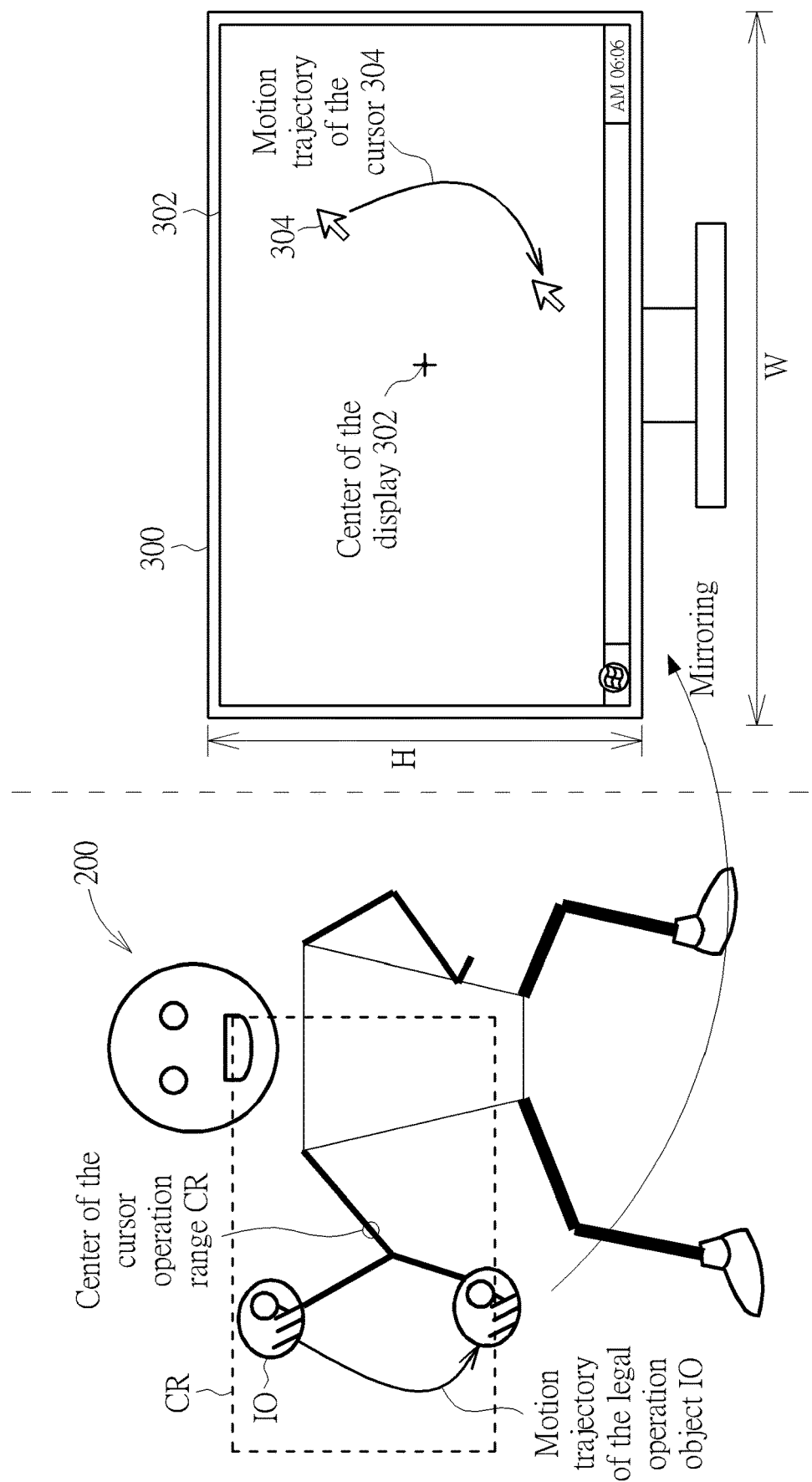
FIGS. 16, 17 are diagrams illustrating relationships between the operator, the legal operation object, and the display of the electronic device in the one-hand control mode of the cursor mode.
Figure 17:
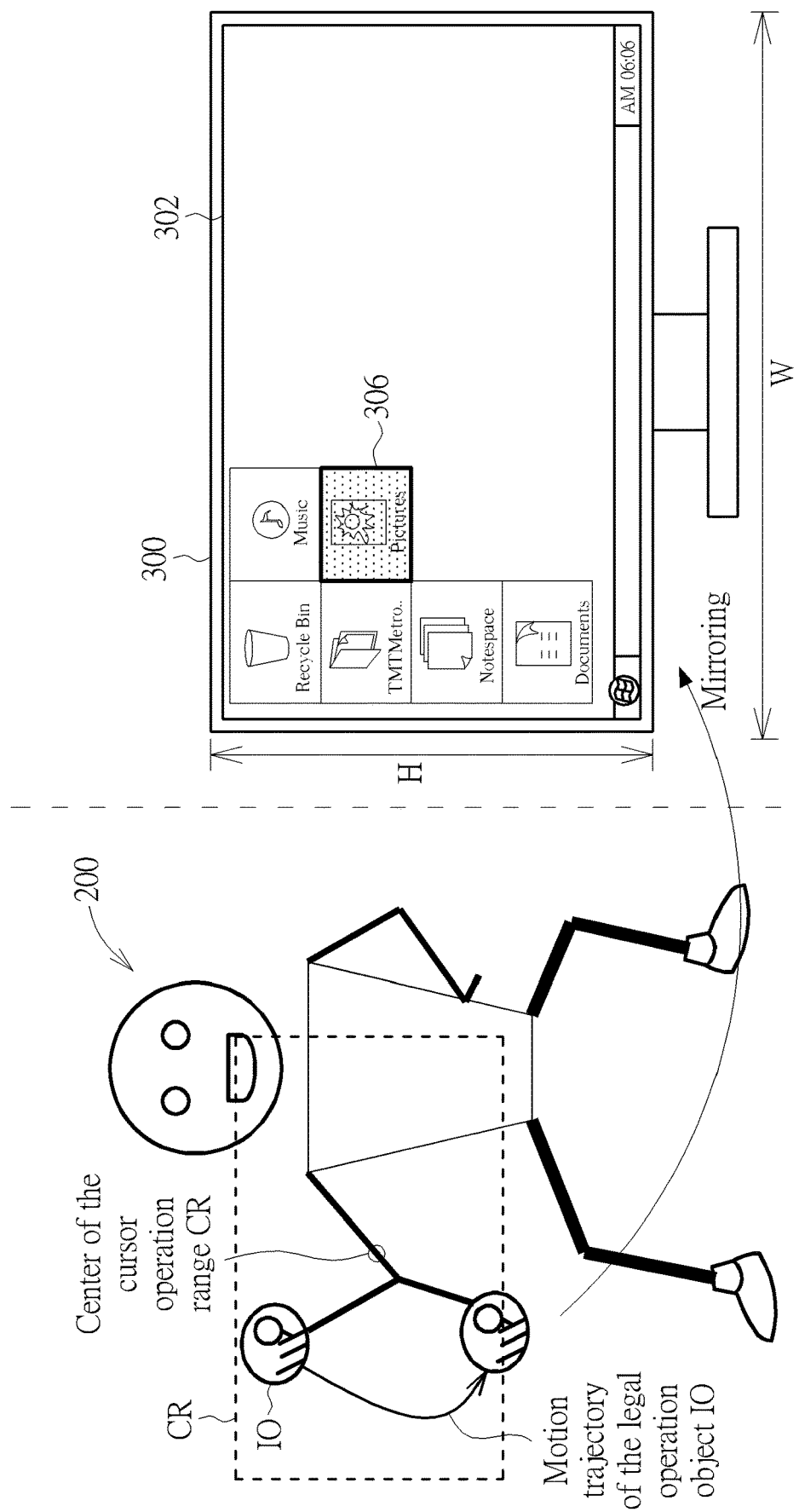
Figure 18:
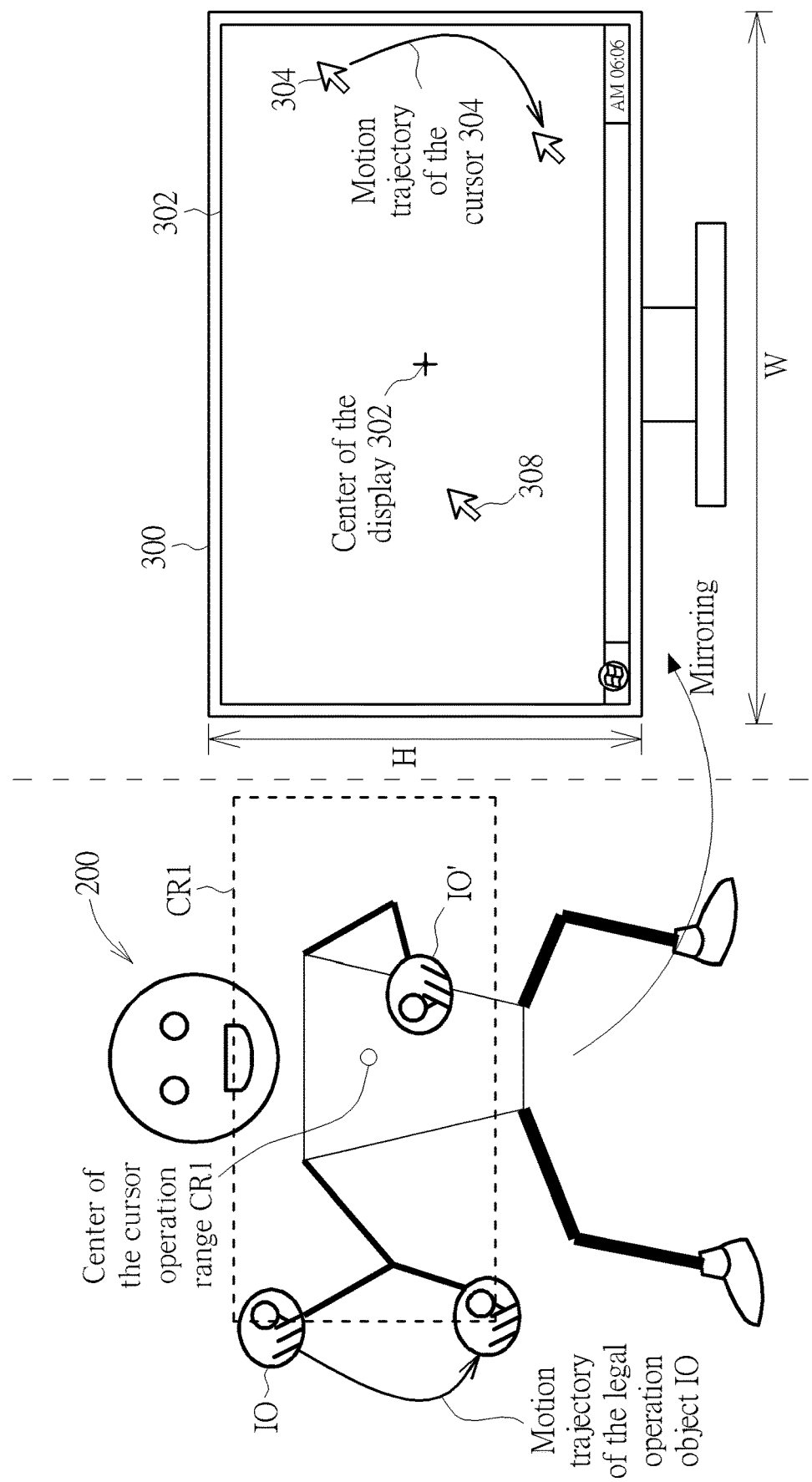
FIG. 18 is a diagram illustrating relationships between the operator, the legal operation objects, and the display of the electronic device in the two-hand control mode of the cursor mode.

Please refer to FIGS. 16-18. FIGS. 16, 17 are diagrams illustrating relationships between the operator 200, the legal operation object IO, and the display 302 of the electronic device 300 in the one-hand control mode of the cursor mode, and FIG. 18 is a diagram illustrating relationships between the operator 200, the legal operation object IO, a legal operation object IO', and the display 302 of the electronic device 300 in the two-hand control mode of the cursor mode. As shown in FIG. 16, when the legal operation object IO (e.g. the right hand of the operator 200) is moved from top to bottom within the cursor operation range CR, the cursor processing unit 114 can generate the cursor control command CCC to control the electronic device 300 according to the position of the legal operation object IO (that is, the cursor processing unit 114 can mirror a motion trajectory of the legal operation object IO to the display 302 of the electronic device 300), so the operator 200 can see a motion trajectory of the cursor 304 (corresponding to the legal operation object IO and has the coordinate (X, Y) generated according to equation (4) and equation (5)) displayed on the display 302 of the electronic device 300. In addition, a center of the cursor operation range CR corresponds to a center of the display 302 of the electronic device 300 after a mirror operation being executed by the cursor processing unit 114. In addition, as shown in FIG. 17, the display 302 of the electronic device 300 may not display the cursor 304 when the display 302 of the electronic device 300 displays a Graphical User Interface (GUI). Therefore, when the display 302 of the electronic device 300 displays the Graphical User Interface, luminance of an icon 306 displayed on the display 302 of the electronic device 300 selected by the operator 200 is increased to correspond to a current position of the legal operation object IO. As shown in FIG. 18, in the two-hand control mode of the cursor mode, when the legal operation object IO (e.g. the right hand of the operator 200) is moved from top to bottom within the cursor operation range CR1, the cursor processing unit 114 can generate the cursor control command CCC to control the electronic device 300 according to the position of the legal operation object IO, so the operator 200 can see the motion trajectory of the cursor 304 (corresponding to the legal operation object IO) displayed on the display 302 of the electronic device 300. In addition, a center of the cursor operation range CR1 corresponds to a center of the center of the display 302 of the electronic device 300 after the mirror operation being executed by the cursor processing unit 114. In addition, control commands corresponding to the cursor mode provided by the present invention can also be applied to a multi-touch application. For example, when the legal operation object IO' (e.g. the left hand of the operator 200) is static within the cursor operation range CR1, the cursor processing unit 114 can generate another cursor control command CCC to control the electronic device 300 according to a position of the legal operation object IO', so the operator 200 can see that a cursor 308 (corresponding to the legal operation object IO') displayed on the display 302 of the electronic device 300 is static.

In addition, the control command FCC corresponding to static gestures, the control command SCC corresponding to dynamic gestures, and the control command CCC corresponding to the cursor mode can be applied to different applications. For example, when the display 302 of the electronic device 300 displays the Graphical User Interface, the remote control system 100 can be automatically switched to the cursor mode; and when the display 302 of the electronic device 300 does not display the Graphical User Interface (for example, the display 302 of the electronic device 300 plays a program), the remote control system 100 can be automatically switched to the control command FCC corresponding to static gestures or the control command SCC corresponding to dynamic gestures.

Figure 19:
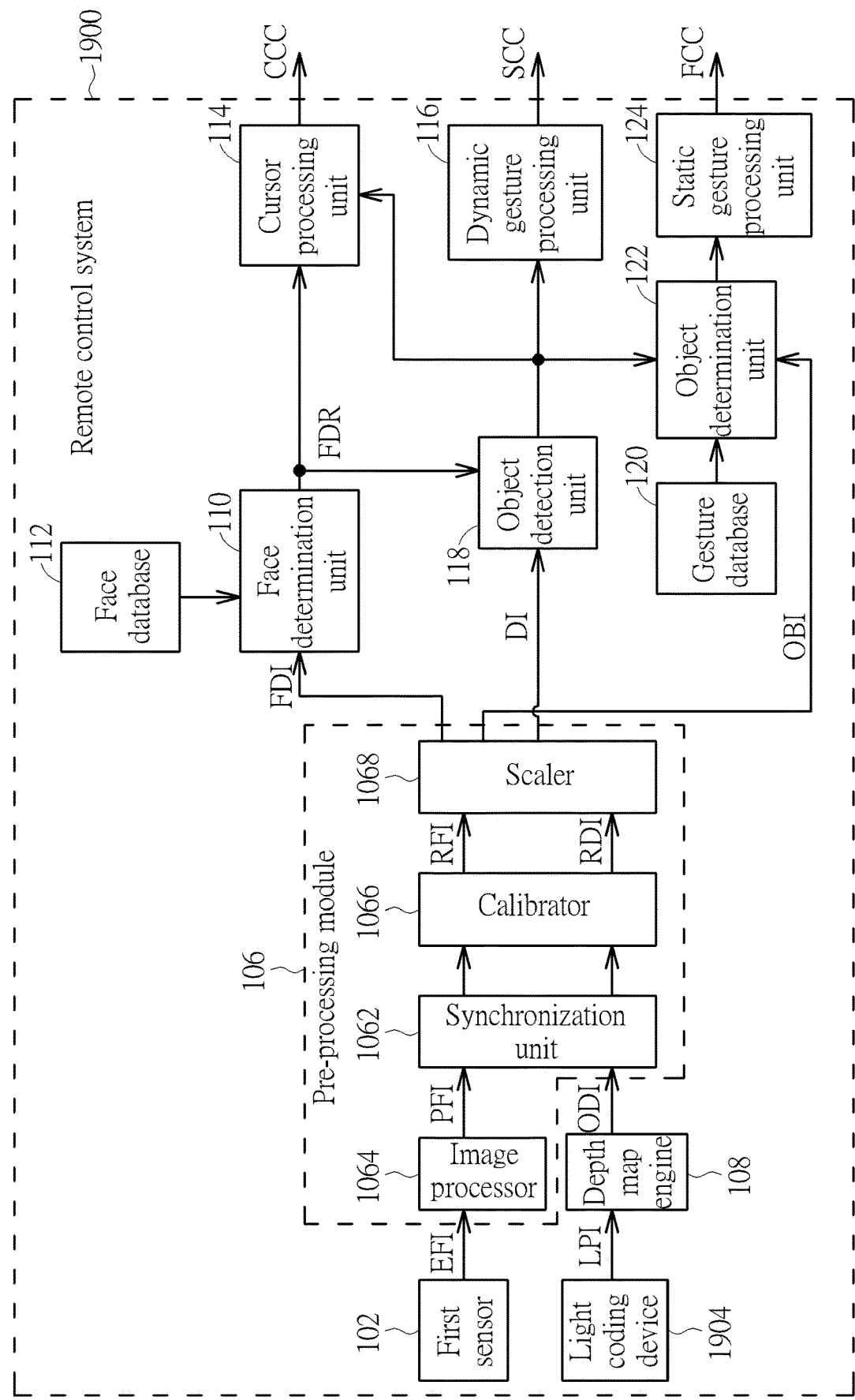
FIG. 19 is a diagram illustrating a remote control system according to another embodiment of the present invention.

Please refer to FIG. 19. FIG. 19 is a diagram illustrating a remote control system 1900 according to another embodiment of the present invention. As shown in FIG. 19, differences between the remote control system 1900 and the remote control system 100 are that the remote control system 1900 utilizes a light coding device 1904 to substitute for the second sensor 104 of the remote control system 100, and the depth map engine 108 of the remote control system 1900 is between the pre-processing module 106 and the light coding device 1904, wherein the pre-processing module 106 of the remote control system 1900 includes a synchronization unit 1062, an image processor 1064, a calibrator 1066, and a scaler 1068, and the present invention is not limited to a sequence of the synchronization unit 1062, the image processor 1064, the calibrator 1066, and the scaler 1068 of the pre-processing module 106 of the remote control system 1900 shown in FIG. 19. That is to say, the sequence of the synchronization unit 1062, the image processor 1064, the calibrator 1066, and the scaler 1068 shown in FIG. 19 can be changed. As shown in FIG. 19, after the remote control system 1900 is powered on, the first sensor 102 is used for capturing a plurality of first images FI and the light coding device 1904 is used for emitting monochromatic light of at least one predetermined pattern, and capturing and outputting a monochromatic light image LPI of a predetermined pattern of the at least one predetermined pattern. After the monochromatic light image LPI is generated, the depth map engine 108 can generate an original depth image ODI according to the monochromatic light image LPI. The image processor 1064 is coupled to the first sensor 102 for executing an image processing on each first image EFI of the plurality of first images FI to generate a first processed image PFI, wherein the original depth image ODI corresponds to the first processed image PFI; the calibrator 1066 is coupled to the synchronization unit 1062, wherein the synchronization unit 1062 is used for making the calibrator 1066 simultaneously execute a calibration processing on the first processed image PFI and the original depth image ODI to generate a first rectified image RFI and a rectified depth image RDI, respectively; and the scaler 1068 is coupled to the calibrator 1066 for scaling the first rectified image RFI and the rectified depth image RDI to generate images with different sizes. For example, a face determination image FDI, an object determination image OBI, and a depth image DI, wherein the face determination image FDI can be the reference image RI shown in FIG. 1. In addition, subsequent operational principles of the remote control system 1900 are the same as those of the remote control system 100, so further description thereof is omitted for simplicity.

In addition, the remote control system 100 and the remote control system 1900 are not limited to being applied to televisions, that is, the remote control system 100 and the remote control system 1900 can be applied to other devices having remote control function.

Figure 20:
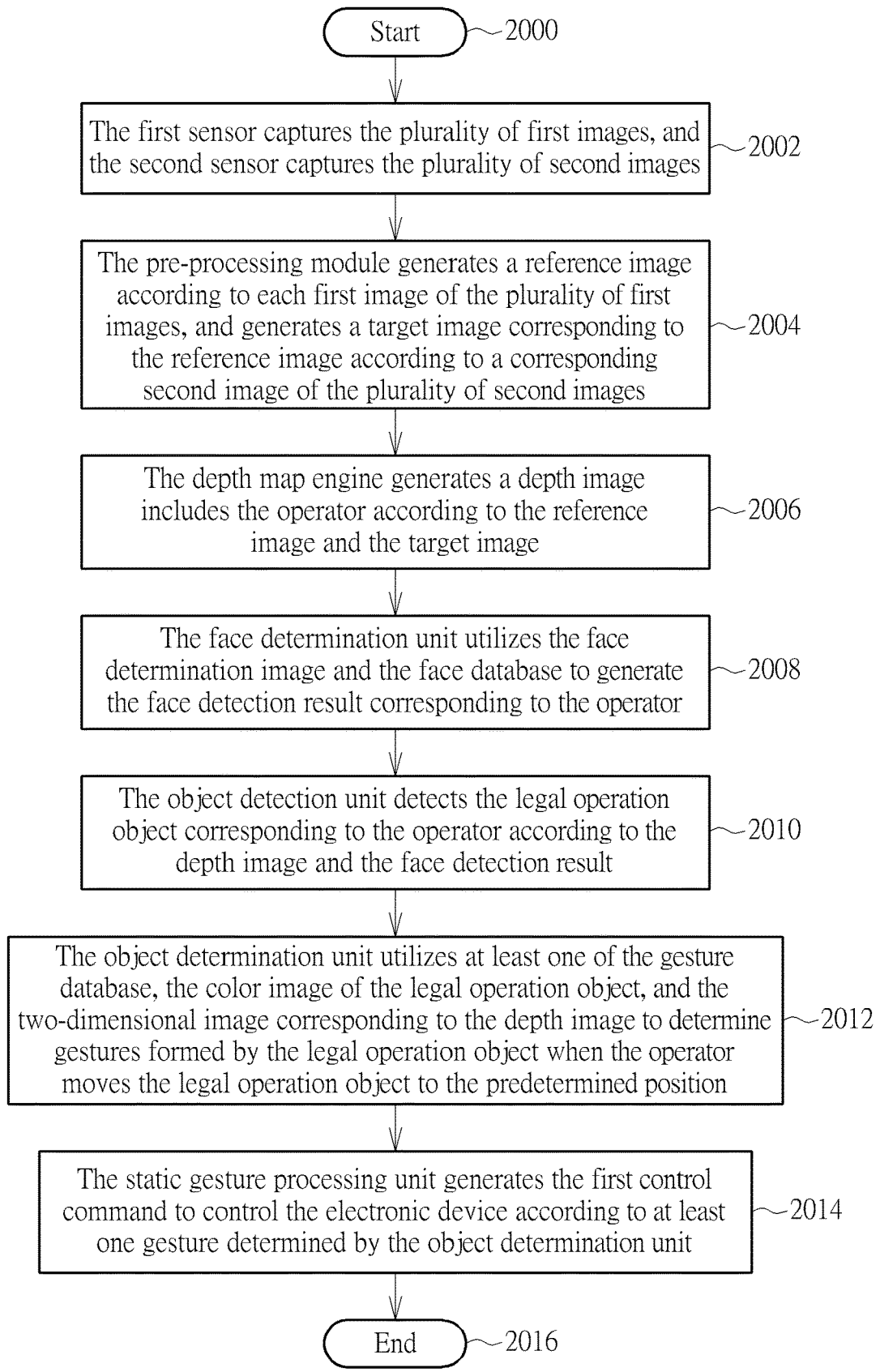
FIG. 20 is a flowchart illustrating a method of generating a first control command according to at least one static gesture according to another embodiment of the present invention.

Please refer to FIGS. 1-7 and FIG. 20. FIG. 20 is a flowchart illustrating a method of generating a first control command according to at least one static gesture according to another embodiment of the present invention. The method in FIG. 20 is illustrated using the remote control system 100 in FIG. 1. Detailed steps are as follows:

Step 2000: Start.

Step 2002: The first sensor 102 captures the plurality of first images FI, and the second sensor 104 captures the plurality of second images SI.

Step 2004: The pre-processing module 106 generates a reference image RI according to each first image of the plurality of first images FI, and generates a target image TI corresponding to the reference image RI according to a corresponding second image of the plurality of second images SI.

Step 2006: The depth map engine 108 generates a depth image DI includes the operator 200 according to the reference image RI and the target image TI.

Step 2008: The face determination unit 110 utilizes the face determination image FDI and the face database 112 to generate the face detection result FDR corresponding to the operator 200.

Step 2010: The object detection unit 118 detects the legal operation object IO corresponding to the operator 200 according to the depth image DI and the face detection result FDR.

Step 2012: The object determination unit 122 utilizes at least one of the gesture database 122, the color image of the legal operation object IO, and the two-dimensional image corresponding to the depth image DI to determine gestures formed by the legal operation object IO when the operator 200 moves the legal operation object IO to the predetermined position PL.

Step 2014: The static gesture processing unit 124 generates the first control command FCC to control the electronic device 300 according to at least one gesture determined by the object determination unit 122.

Step 2016: End.

In Step 2002, the plurality of first images FI captured by the first sensor 102 are a plurality of left eye images, and the plurality of second images SI captured by the second sensor 104 are a plurality of right eye images. In Step 2004, the synchronization unit 1062 of the pre-processing module 106 can output the first synchronization signal to each first image EFI of the plurality of first images FI and the corresponding second synchronization signal to the second image CSI (corresponding to the first image EFI) of the plurality of second images SI (thus, the image processor 1064 can process the first image EFI and the second image CSI together according to the first synchronization signal and the corresponding second synchronization signal). After the image processor 1064 receives the first image EFI and the second image CSI, the image processor 1064 can simultaneously execute the image processing on the first image EFI and the second image CSI to generate the first processed image PFI and the second processed image PSI, respectively. After the calibrator 1066 of the pre-processing module 106 receives the first processed image PFI and the second processed image PSI, the calibrator 1066 can execute the calibration processing on the first processed image PFI and the second processed image PSI to generate the first rectified image RFI and the second rectified image RSI, respectively. In addition, the scaler 1068 of the pre-processing module 106 can scale the first rectified image RFI and the second rectified image RSI to generate images with different sizes (e.g. the reference image RI, the target image TI, the face determination image FDI, and the object determination image OBI). In Step 2008, as shown in FIG. 1, the face determination unit 110 can utilize the face determination image FDI and the face database 112 to generate the face detection result FDR corresponding to the operator 200, wherein the face detection result FDR of the operator 200 includes the information of length, width, feature points, and positions corresponding to the face 202 of the operator 200, and the face database 112 can store the information of length, width, feature points, and positions corresponding to the face 202 of the operator 200. But, the present invention is not limited to the face detection result FDR of the operator 200 only including the information of length, width, feature points, and positions corresponding to the face 202 of the operator 200.

In Step 2010, after the depth image DI and the face detection result FDR corresponding to the operator 200 are generated, the object detection unit 118 of the remote control system 100 can first determine the rough distance DR between the operator 200 and the remote control system 100 according to the depth image DI and the face detection result FDR corresponding to the operator 200 (as shown in FIG. 3, for example, the rough distance DR between the operator 200 and the remote control system 100 is 2 meters, wherein the remote control system 100 is installed above the electronic device 300 (e.g. a television)). After the object detection unit 118 determines the rough distance DR between the operator 200 and the remote control system 100, the object detection unit 118 can detect whether the legal operation object IO (e.g. the right hand of the operator 200) corresponding to the operator 200 exists around the operator 200 according to the rough distance DR (for example, the object detection unit 118 can detect whether the legal operation object IO exists within the predetermined distance PD in front of the operator 200). After the object detection unit 118 detects that legal operation object IO exists within the predetermined distance PD in front of the operator 200, the object detection unit 118 can provide the information of the color image corresponding to the legal operation object IO, wherein the information of the color image of the legal operation object IO includes length, width, and depth of the legal operation object IO. In addition, in another embodiment of the present invention, after the object detection unit 118 detects that legal operation object IO exists within the predetermined distance PD in front of the operator 200, the object detection unit 118 can provide the information of the grayscale image corresponding to the legal operation object IO, wherein the information of the grayscale image of the legal operation object IO includes length, width, and depth of the legal operation object IO. After the object detection unit 118 detects that legal operation object IO exists within the predetermined distance PD in front of the operator 200, the remote control system 100 can notice the operator 200 to start to operate the electronic device 300. For example, the remote control system 100 can utilize flash or control the display of the electronic device 300 to notice the operator 200 to start to operate the electronic device 300.

In Step 2012, taking the legal operation object IO being in front of the operator 200 as an example, after the remote control system 100 notices the operator 200 to start to operate the electronic device 300, the operator 200 moves the legal operation object IO forward to the predetermined position PL (as shown in FIG. 4) within the first predetermined period and pulls the legal operation object IO after the operator 200 moves the legal operation object IO to the predetermined position PL, wherein as shown in FIG. 4, when the legal operation object IO is located at the predetermined position PL, the minimum distance exists between the legal operation object IO and the remote control system 100. But, the present invention is not limited to the minimum distance existing between the legal operation object IO and the remote control system 100 when the legal operation object IO is located at the predetermined position PL. That is to say, any configuration in which a distance between the legal operation object IO and the remote control system 100 is less than a distance between the operator 200 and the remote control system 100 when the legal operation object IO is located at the predetermined position PL falls within the scope of the present invention. In addition, the present invention is not limited to the operator 200 moving the legal operation object IO forward to the predetermined position PL within the first predetermined period. That is to say, in another embodiment of the present invention, the operator 200 can upward move the legal operation object IO to another predetermined position PLU (as shown in FIG. 4) within the first predetermined period. In addition, in another embodiment of the present invention, the operator 200 can also downward move the legal operation object IO to another predetermined position within the first predetermined period.

Because when the operator 200 watches the electronic device 300, the operator 200 may arbitrarily move the legal operation object IO (thus, a motion of the operator 200 arbitrarily moving the legal operation object IO may make the object determination unit 122 be confused), the object determination unit 122 can determine that the motion of the operator 200 moving the legal operation object IO shown in FIG. 4 (that is, the operator 200 moves the legal operation object IO forward to the predetermined position PL within the first predetermined period and pulls the legal operation object IO after the operator 200 moves the legal operation object IO to the predetermined position PL) is an effective motion. As shown in FIG. 5, after the remote control system 100 notices the operator 200 to start to operate the electronic device 300, the operator 200 moves the legal operation object IO forward to the predetermined position PL within the first predetermined period PP and pulls the legal operation object IO after the operator 200 moves the legal operation object IO to the predetermined position PL, so the distance between the legal operation object IO and the remote control system 100 is gradually reduced to the predetermined position PL and then is gradually increased. Therefore, after the distance between the legal operation object IO and the remote control system 100 is less than the effective distance VD (wherein the effective distance VD can be determined by the distance DF between the face 202 of the operator 200 and the remote control system 100), the object determination unit 122 can utilize at least one of the gesture database 120, the color image of the legal operation object IO, and the two-dimensional image (e.g. the object determination image OBI) corresponding to the depth image DP to determine a gesture formed by the legal operation object IO when the legal operation object IO is located at the predetermined position PL. As shown in FIG. 6, when the legal operation object IO is located at the predetermined position PL, the object determination unit 122 can determine the gestures formed by the legal operation object IO corresponding to numbers 0-9 and confirmation, respectively. But, the present invention is not limited to the legal operation object IO only forming the gestures corresponding to numbers 0-9 and confirmation respectively when the legal operation object IO is located at the predetermined position PL.

As shown in FIG. 7, at the time T1, the operator 200 moves the legal operation object IO forward from the initiation position of the legal operation object IO (corresponding to the time T0) to the predetermined position PL (corresponding to the time T1). Meanwhile, the object determination unit 122 determines that the gesture formed by the legal operation object IO represents number "2"; at the time T2, the operator 200 pulls the legal operation object IO from the predetermined position PL; at the time T3, the operator 200 moves the legal operation object IO forward to the predetermined position PL again. Meanwhile, the object determination unit 122 determines that the gesture formed by the legal operation object IO represents number "4"; at the time T4, the operator 200 pulls the legal operation object IO from the predetermined position PL again; at the time T5, the operator 200 moves the legal operation object IO forward to the predetermined position PL again. Meanwhile, the object determination unit 122 determines that the gesture formed by the legal operation object IO represents number "1", wherein each of the gestures (that is, numbers "2", "4", "1" shown in FIG. 7) formed by the legal operation object IO needs to be completed within the first predetermined period PP shown in FIG. 5. For example, the time interval (that is, the time T0-T1) for the object determination unit 122 determining number "2" shown in FIG. 7, the time interval (that is, the time T2-T3) for the object determination unit 122 determining number "4" shown in FIG. 7, and the time interval (that is, the time T4-T5) for the object determination unit 122 determining number "1" shown in FIG. 7 are less than or equal to the first predetermined period PP. In addition, a time interval between each of the gestures (that is, numbers "2", "4", "1" shown in FIG. 7) formed by the legal operation object IO and a next gesture formed by the legal operation object IO is less than or equal to the predetermined time T (e.g. 2 seconds). That is to say, the time interval between the time T1-T2 and the time interval between the time T3-T4 is less than or equal to the predetermined time T. But, the present invention is not limited to the predetermined time T being 2 seconds. If after the time T5, the legal operation object IO does not form a new gesture again within the predetermined time T (e.g. 2 seconds), because the object determination unit 122 has determined numbers "2", "4", "1" according to the above mentioned gestures formed by the legal operation object IO during the time T1-T5, in Step 2014, the static gesture processing unit 124 can generate the first control command FCC to control the electronic device 300 according to the gestures determined by the object determination unit 122 representing numbers "2", "4", "1", respectively. For example, the first control command FCC can control the electronic device 300 to switch to the predetermined channel (e.g. the channel 241). In addition, if after the time T5, the operator 200 makes the legal operation object IO form the gesture representing "confirmation" within the predetermined time T, because before the gesture representing "confirmation", the object determination unit 122 has determined numbers "2", "4", "1" according to the above mentioned gestures formed by the legal operation object IO during the time T1-T5, the static gesture processing unit 124 can also generate the first control command FCC to control the electronic device 300 according to the gestures determined by the object determination unit 122 representing numbers "2", "4", "1", respectively. In addition, in FIG. 4, because the object determination unit 122 determines a gesture formed by the legal operation object IO when the operator 200 moves the legal operation object IO forward to the predetermined position PL (that is, the legal operation object IO has significant variation of Z coordinate relative to the plane OP where the face 202 of the operator 200 is located), when the legal operation object IO has significant variations of X, Y coordinates relative to the plane OP where the face 202 of the operator 200 is located, the object determination unit 122 can neglect a gesture formed by the legal operation object IO.

Figure 21:
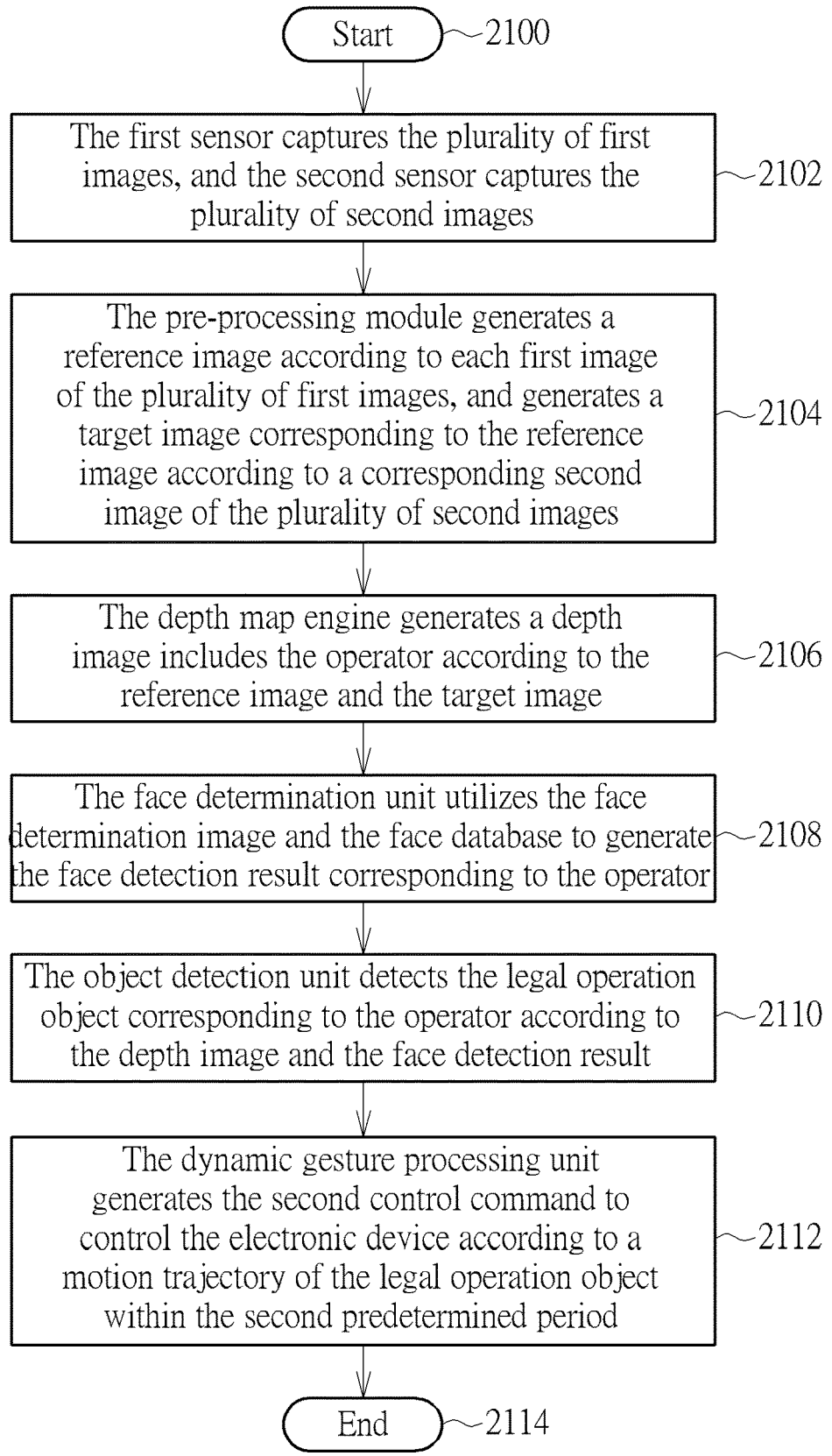
FIG. 21 is a flowchart illustrating a method of generating a second control command according to a dynamic gesture according to another embodiment of the present invention.

Please refer to FIGS. 10-12 and FIG. 21. FIG. 21 is a flowchart illustrating a method of generating a second control command according to a dynamic gesture according to another embodiment of the present invention. The method in FIG. 21 is illustrated using the remote control system 100 in FIG. 1. Detailed steps are as follows:

Step 2100: Start.

Step 2102: The first sensor 102 captures the plurality of first images FI, and the second sensor 104 captures the plurality of second images SI.

Step 2104: The pre-processing module 106 generates a reference image RI according to each first image of the plurality of first images FI, and generates a target image TI corresponding to the reference image RI according to a corresponding second image of the plurality of second images SI.

Step 2106: The depth map engine 108 generates a depth image DI includes the operator 200 according to the reference image RI and the target image TI.

Step 2108: The face determination unit 110 utilizes the face determination image FDI and the face database 112 to generate the face detection result FDR corresponding to the operator 200.

Step 2110: The object detection unit 118 detects the legal operation object IO corresponding to the operator 200 according to the depth image DI and the face detection result FDR.

Step 2112: The dynamic gesture processing unit 116 generates the second control command SCC to control the electronic device 300 according to a motion trajectory of the legal operation object IO within the second predetermined period.

Step 2114: End.

A difference between the embodiment in FIG. 21 and the embodiment in FIG. 20 is that in Step 2112, as shown in FIG. 10, when the operator 200 moves the legal operation object IO within the second predetermined period, the dynamic gesture processing unit 116 determines that the operator 200 moves the legal operation object IO downward according to the motion trajectory MT (shown in FIG. 10) of the legal operation object IO within the second predetermined period (wherein the motion trajectory MT (shown in FIG. 10) of the legal operation object IO within the second predetermined period forms the downward vector DV), so the dynamic gesture processing unit 116 can generate the corresponding second control command SCC to control the electronic device 300 according to the downward vector DV (for example, the second control command SCC can control the electronic device 300 to switch to the previous channel corresponding to the current playing channel from the current playing channel). That is to say, within the second predetermined period, the legal operation object IO starts to have significant variations of X, Y coordinates relative to the plane OP until the legal operation object IO is static for a period of time, or the legal operation object IO disappears (for example, the operator 200 pulls the legal operation object IO to make the legal operation object IO disappear in the image capture range of the remote control system 100). In addition, the dynamic gesture processing unit 116 can generate another second control command SCC according to FIGS. 11-12, so further description thereof is omitted for simplicity.

Figure 22:
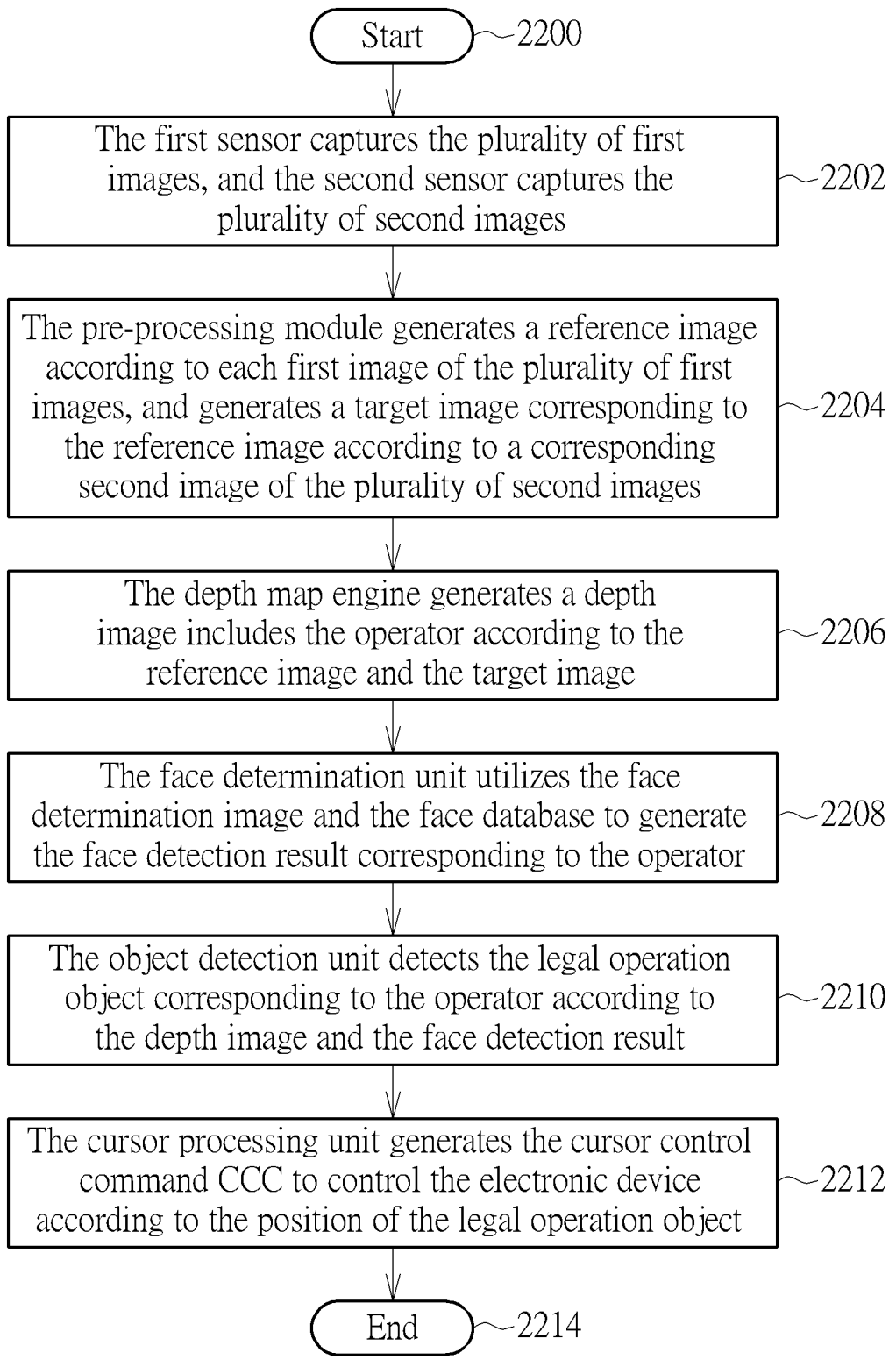
FIG. 22 is a flowchart illustrating a method of generating a cursor control command according to another embodiment of the present invention.

Please refer to FIGS. 13-18 and FIG. 22. FIG. 22 is a flowchart illustrating a method of generating a cursor control command according to another embodiment of the present invention. The method in FIG. 22 is illustrated using the remote control system 100 in FIG. 1. Detailed steps are as follows:

Step 2200: Start.

Step 2202: The first sensor 102 captures the plurality of first images FI, and the second sensor 104 captures the plurality of second images SI.

Step 2204: The pre-processing module 106 generates a reference image RI according to each first image of the plurality of first images FI, and generates a target image TI corresponding to the reference image RI according to a corresponding second image of the plurality of second images SI.

Step 2206: The depth map engine 108 generates a depth image DI includes the operator 200 according to the reference image RI and the target image TI.

Step 2208: The face determination unit 110 utilizes the face determination image FDI and the face database 112 to generate the face detection result FDR corresponding to the operator 200.

Step 2210: The object detection unit 118 detects the legal operation object IO corresponding to the operator 200 according to the depth image DI and the face detection result FDR.

Step 2212: The cursor processing unit 114 generates the cursor control command CCC to control the electronic device 300 according to the position of the legal operation object IO.

Step 2214: End.

A difference between the embodiment in FIG. 21 and the embodiment in FIG. 20 is that in Step 2212, as shown in FIG. 13, the width of the face 202 of the operator 200 is represented as L and the vertex of the face 202 of the operator 200 is represented as YFT. If the operator 200 is used to use the right hand thereof, the cursor processing unit 114 can utilize equation (1) and equation (2) to find the coordinate (XC, YC) of the center corresponding to the display of the electronic device 300 within the cursor operation range CR of the operator 200 corresponding to the one-hand control mode of the cursor mode and define the cursor operation range CR, wherein the horizontal range of the cursor operation range CR is XC±(L*FratioH) and the vertical range of the cursor operation range CR is YC±(L*FratioV). After the cursor processing unit 114 defines the cursor operation range CR, the cursor processing unit 114 can generate the cursor control command CCC to control the electronic device 300 according to the position of the legal operation object IO. In addition, if the operator 200 is used to use the left hand thereof, the cursor operation range corresponding to the left hand of the operator 200 can be defined by the above mentioned method, so further description thereof is omitted for simplicity.

In addition, as shown in FIG. 14, the cursor processing unit 114 can define the centerline XFC of the face 202 of the operator 200 (corresponding to the two-hand control mode of the cursor mode) according to the face detection result FDR, wherein the width of the face 202 of the operator 200 is represented as L and the vertex of the face 202 of the operator 200 is represented as YFT. Therefore, the cursor processing unit 114 can utilize equation (2) and equation (3) to find the coordinate (XC, YC) of the center corresponding to the display of the electronic device 300 within the cursor operation range CR1 of the operator 200 corresponding to the two-hand control mode of the cursor mode, and define the cursor operation range CR1 according to equation (2) and equation (3), wherein the horizontal range of the cursor operation range CR1 is XC±2*(L*FratioH), and the vertical range of the cursor operation range CR is YC±(L*FratioV).

As shown in FIG. 15, if the coordinate of the legal operation object IO within the cursor operation range CR is (XI, YI), the coordinate of the upper left corner of the cursor operation range CR is (XS, YS), width and height of the cursor operation range CR are RX, RY respectively, and width and height of the display of the electronic device 300 are W, H respectively, the cursor processing unit 114 can generate the coordinate (X, Y) of the cursor displayed on the display of the electronic device 300 corresponding to the legal operation object IO according to the coordinate (XI, YI) of the legal operation object IO, equation (4), and equation (5). In addition, because the display of the electronic device 300 and the face 202 of the operator 200 face each other, left/right directions of the position of the legal operation object IO will mirror left/right directions of the coordinate (X, Y) of the cursor displayed on the display of the electronic device 300. In addition, because the refresh frequency of the display of the electronic device 300 is usually greater than the frequency of the remote control system 100 capturing images, the cursor processing unit 114 can further utilize a filter or an interpolation method to reduce jitters of the cursor displayed on the display of the electronic device 300 and increase smoothness of a trajectory of the cursor displayed on the display of the electronic device 300.

As shown in FIG. 16, when the legal operation object IO (e.g. the right hand of the operator 200) is moved from top to bottom within the cursor operation range CR, the cursor processing unit 114 can generate the cursor control command CCC to control the electronic device 300 according to the position of the legal operation object IO (that is, the cursor processing unit 114 can mirror the motion trajectory of the legal operation object IO to the display 302 of the electronic device 300), so the operator 200 can see the motion trajectory of the cursor 304 (corresponding to the legal operation object IO). In addition, as shown in FIG. 17, the display 302 of the electronic device 300 may not display the cursor 304 when the display 302 of the electronic device 300 displays the Graphical User Interface. Therefore, when the display 302 of the electronic device 300 displays the Graphical User Interface, the luminance of the icon 306 displayed on the display 302 of the electronic device 300 selected by the operator 200 is increased to correspond to the current position of the legal operation object IO. As shown in FIG. 18, in the two-hand control mode of the cursor mode, when the legal operation object IO (e.g. the right hand of the operator 200) is moved from top to bottom within the cursor operation range CR1, the cursor processing unit 114 can generate the cursor control command CCC to control the electronic device 300 according to the position of the legal operation object IO, so the operator 200 can see the motion trajectory of the cursor 304 (corresponding to the legal operation object IO) displayed on the display 302 of the electronic device 300. In addition, the center of the cursor operation range CR1 corresponds to the center of the center of the display 302 of the electronic device 300 after the mirror operation being executed by the cursor processing unit 114. In addition, control commands corresponding to the cursor mode provided by the present invention can also be applied to the multi-touch application. For example, when the legal operation object IO' (e.g. the left hand of the operator 200) is static within the cursor operation range CR1, the cursor processing unit 114 can generate another cursor control command CCC to control the electronic device 300 according to the position of the legal operation object IO', so the operator 200 can see that the cursor 308 (corresponding to the legal operation object IO') displayed on the display 302 of the electronic device 300 is static.

In addition, the control command FCC corresponding to static gestures, the control command SCC corresponding to dynamic gestures, and the control command CCC corresponding to the cursor mode can be applied to different applications. For example, when the display 302 of the electronic device 300 displays the Graphical User Interface, the remote control system 100 can be automatically switched to the cursor mode; and when the display 302 of the electronic device 300 does not display the Graphical User Interface (for example, the display 302 of the electronic device 300 plays a program), the remote control system 100 can be automatically switched to the control command FCC corresponding to static gestures or the control command SCC corresponding to dynamic gestures.

To sum up, the remote control system and the method of generating a control command according to at least one static gesture utilize the object detection unit to detect the legal operation object corresponding to the operator according to the depth image including the operator and the face detection result corresponding to the operator, utilize the object determination unit to determine at least one gesture formed by the legal operation object, and utilize the static gesture processing unit to generate the control command to control the electronic device according to the at least one gesture determined by the object determination unit. Therefore, compared to the prior art, the present invention has advantages as follows: first, the control command provided by the present invention is compose d of at least one simple gesture, so the present invention does not need complicated gestures and operations; second, because the present invention does not need complicated gestures and operations, the present invention can provide a friendly operation method which can meet body mechanics of the operator; third, because the present invention does not need complicated gestures and operations, the present invention can provide a method for rapidly generating the control command; fourth, because the present invention does not need complicated gestures and operations, the remote control system provided by the present invention does not need a powerful processor and a large-capacity memory.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A remote control system, comprising:
    an object detection circuit detecting an object corresponding to an operator according to a depth image comprising the operator and a face detection result corresponding to the operator,
    an object determination circuit utilizing at least one of a gesture database, a color image of the object, and a two-dimensional image corresponding to the depth image to determine whether a gesture is formed by the object; and
    a static gesture processing circuit recording a static gesture formed by the object and determined by the object determination unit when the object is moved within a first predetermined period to make a local minimum distance between the object and the remote control system occur, and generating a first control command to control an electronic device according to a plurality of static gestures in turn recorded into the static gesture processing circuit when no new gesture is formed by the object within a predetermined time after a last gesture of the plurality of static gestures.

2. The remote control system of claim 1, wherein the object is one hand of the operator, and the color image of the object comprises information of length, width, and depth corresponding to the object.

3. The remote control system of claim 1, wherein when the object is moved to a predetermined position within the first predetermined period to make the local minimum distance between the object and the remote control system occur, the static gesture formed by the object is determined, and then the object is pulled away from the predetermined position.

4. The remote control system of claim 1, further comprising:
a dynamic gesture processing circuit coupled to the object detection circuit for generating a second control command to control the electronic device according to a motion trajectory of the object within a second predetermined period.

5. The remote control system of claim 1, further comprising:
a face determination circuit utilizing a face determination image and a face database to generate the face detection result corresponding to the operator.

6. The remote control system of claim 5, further comprising:
a cursor processing circuit coupled to the face determination circuit for generating a cursor control command to control the electronic device according to a position of the object.

7. The remote control system of claim 1, further comprising:
a first sensor capturing a plurality of first images;
a second sensor capturing a plurality of second images;
a pre-processing module coupled to the first sensor and the second sensor, wherein the pre-processing module generates a reference image according to each first image of the plurality of first images, and generates a target image corresponding to the reference image according to a corresponding second image of the plurality of second images; and
a depth map engine coupled to the pre-processing module for generating the depth image according to the reference image and the target image.

8. The remote control system of claim 7, wherein the pre-processing module comprises:
a synchronization circuit coupled to the first sensor and the second sensor;
an image processor coupled to the synchronization circuit, wherein the synchronization circuit makes the image processor simultaneously execute an image processing on the each first image and the corresponding second image to generate a first processed image and a second processed image, respectively;
a calibrator coupled to the image processor for executing a calibration processing on the first processed image and the second processed image to generate a first rectified image and a second rectified image, respectively; and
a scaler coupled to the calibrator for scaling the first rectified image and the second rectified image to generate images with different sizes, wherein the images with different sizes comprise the reference image and the target image.

9. The remote control system of claim 1, wherein the face detection result of the operator comprises information of length, width, feature points, and positions corresponding to a face of the operator.

10. The remote control system of claim 1, further comprising:
a first sensor capturing a plurality of first images;
a light coding device emitting monochromatic light of at least one predetermined pattern, and capturing and outputting a monochromatic light image of a predetermined pattern of the at least one predetermined pattern;
a depth map engine coupled to the light coding device for generating an original depth image according to the monochromatic light image of the predetermined pattern; and
a pre-processing module coupled to the first sensor and the depth map engine, wherein the pre-processing module generates a reference image according to each first image of the plurality of first images, and generates the depth image according to the original depth image.

11. The remote control system of claim 10, wherein the pre-processing module comprises:
an image processor coupled to the first sensor for executing an image processing on the each first image to generate a first processed image, wherein the original depth image corresponds to the first processed image;
a synchronization circuit coupled to the image processor and the depth map engine;
a calibrator coupled to the synchronization circuit, wherein the synchronization circuit makes the calibrator simultaneously execute a calibration processing on the first processed image and the original depth image to generate a first rectified image and a rectified depth image, respectively; and
a scaler coupled to the calibrator for scaling the first rectified image and the rectified depth image to generate images with different sizes, wherein the images with different sizes comprise the reference image and the depth image.

12. A remote control system, comprising:
an object detection circuit detecting an object corresponding to an operator according to a depth image comprising the operator and a face detection result corresponding to the operator;
an object determination circuit utilizing at least one of a gesture database, a color image of the object, and a two-dimensional image corresponding to the depth image to determine whether a gesture is formed by the object;
a static gesture processing circuit recording a static gesture formed by the object and determined by the object determination unit when the object is moved within a first predetermined period to make a local minimum distance between the object and the remote control system occur, and generating a first control command to control an electronic device according to a plurality of static gestures in turn recorded into the static gesture processing circuit, wherein a time interval between two adjacent static gestures of the plurality of static gestures is less than or equal to a predetermined time.

13. The remote control system of the claim 12, wherein the object is one hand of the operator, and the color image of the object comprises information of length, width, and depth corresponding to the object.

14. The remote control system of the claim 12, wherein the face detection result of the operator comprises information of length, width, feature points, and positions corresponding to a face of the operator.

15. The remote control system of the claim 12, wherein when the object is located at the predetermined position, a minimum distance exists between the object and the remote control system.

16. The remote control system of the claim 12, further comprising:
a face determination circuit further comprised in the remote control system utilizing a face determination image and a face database to generate the face detection result corresponding to the operator.

17. A remote control system, comprising:
- an object determination circuit utilizing at least one of a gesture database, a color image of an object, and a two-dimensional image corresponding to a depth image comprising an operator to determine whether a gesture is formed by of the object; and
- a static gesture processing circuit recording a static gesture formed by the object and determined by the object determination unit when the object is moved within a first predetermined period to make a local minimum distance between the object and the remote control system occur, and generating a first control command to control an electronic device according to a plurality of static gestures in turn recorded into the static gesture processing circuit when no new gesture is formed by the object within a predetermined time after a last gesture of the plurality of static gestures.

18. The remote control system of claim 17, further comprising:
- an object detection circuit detecting the object moved by the operator according to the depth image comprising the operator and a face detection result corresponding to the operator.

\* \* \* \* \*